United States Patent [19]
Young et al.

[11] Patent Number: 5,240,718
[45] Date of Patent: Aug. 31, 1993

[54] PLASTIC BLOW MOLDING MACHINE OF THE WHEEL TYPE

[75] Inventors: William C. Young, Superior Township, Detroit County, Mich.; Michael C. Kitzmiller, Fort Loramie, Ohio

[73] Assignee: Plastipak Packaging, Inc., Plymouth, Mich.

[21] Appl. No.: 797,396

[22] Filed: Nov. 25, 1991

[51] Int. Cl.$^5$ .................. B29C 49/36; B29C 49/56
[52] U.S. Cl. .................................. 425/539; 425/451; 425/540; 425/541
[58] Field of Search ................ 425/538–541, 425/451, 451.4, 450.1, 532, 451.9

[56] References Cited
U.S. PATENT DOCUMENTS

| | | | |
|---|---|---|---|
| 3,310,834 | 3/1967 | Simpson et al. | 425/152 |
| 3,496,599 | 2/1970 | Brown | 425/540 X |
| 3,537,134 | 11/1970 | Raper et al. | 425/540 X |
| 3,608,015 | 9/1971 | Martelli | 264/154 X |
| 3,764,250 | 10/1973 | Waterloo | 425/233 X |
| 3,785,761 | 1/1974 | Logomasini et al. | 425/541 X |
| 3,986,807 | 10/1976 | Takegami et al. | 425/307 |
| 4,650,412 | 3/1987 | Windstrup et al. | 425/539 X |
| 4,834,641 | 5/1989 | Keyser | 425/540 X |

Primary Examiner—Richard L. Chiesa
Attorney, Agent, or Firm—Brooks & Kushman

[57] ABSTRACT

A plastic blow molding machine (40) having a wheel (44) rotatable on a base (42) about a horizontal axis (A) includes a plurality of mold stations (90) mounted on the wheel about the rotational axis and having a pair of mold supports (94) movable toward and away from each other in a parallel relationship to the rotational axis at closing and opening stations (114,116). Operating cams (120,124) of the closing and opening stations cooperate with operating cam followers (110) of the mold stations to provide closing and opening mold movement, and locking cam followers (122,126) of the closing and opening stations cooperate with locking cam followers (112) of the mold stations to lock and unlock a lock mechanism (102) that operates directly between the mold supports (94) of each mold station so that there is no loading of the frame (46) of the wheel during the machine operation. The operating cams (120,124) are preferably biased by associated operating gas springs (136,138), and the locking cams (122,126) are likewise preferably biased by locking gas springs (140,142). The wheel (44) includes a frame (46) having a pair of end frame portions (86) and a central frame portion (88). This central frame portion (88) has a pinion (166) mounted thereon and meshed with a pair of racks (170) respectively mounted on the pair of mold supports (94) to center the mold upon closing.

24 Claims, 12 Drawing Sheets

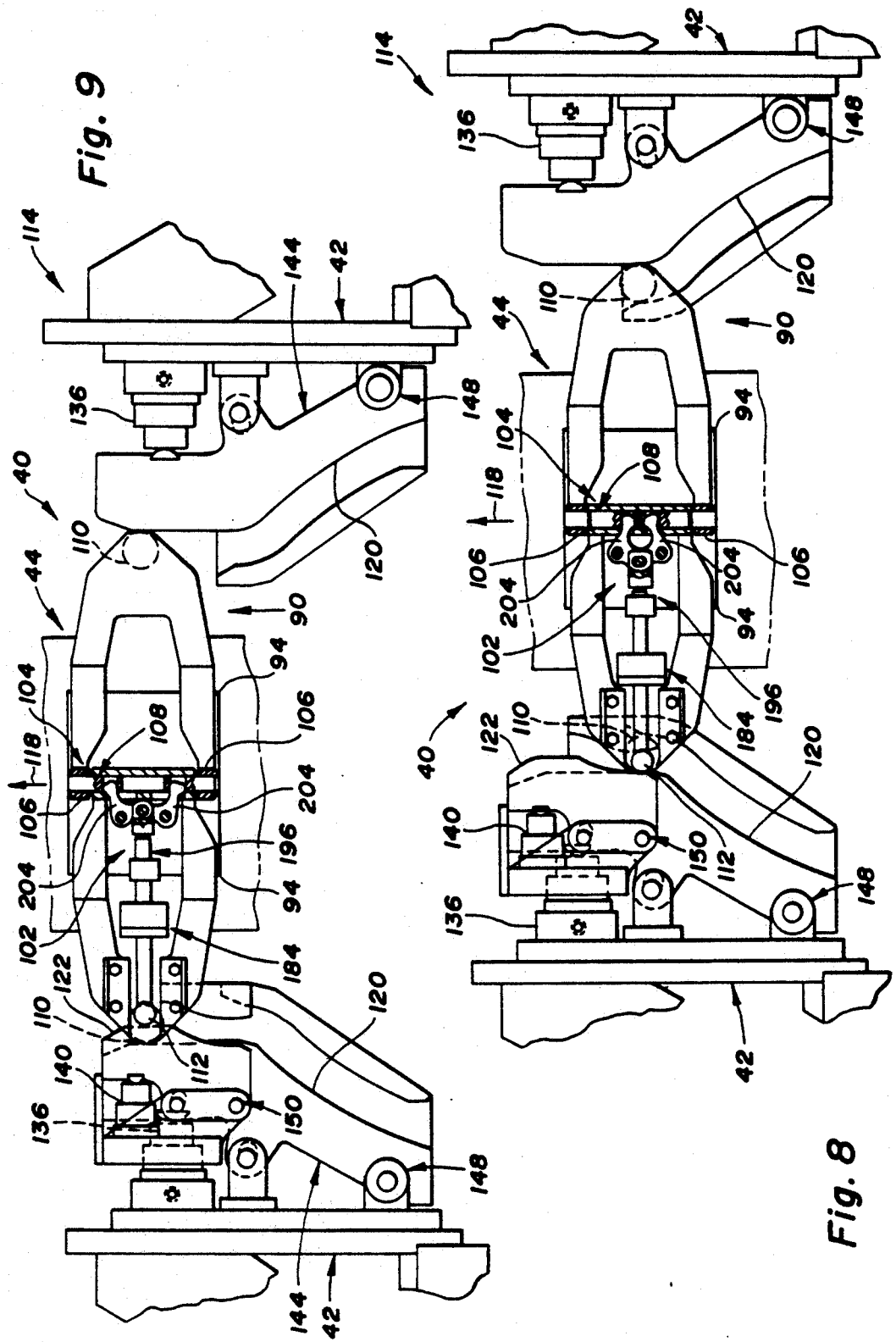

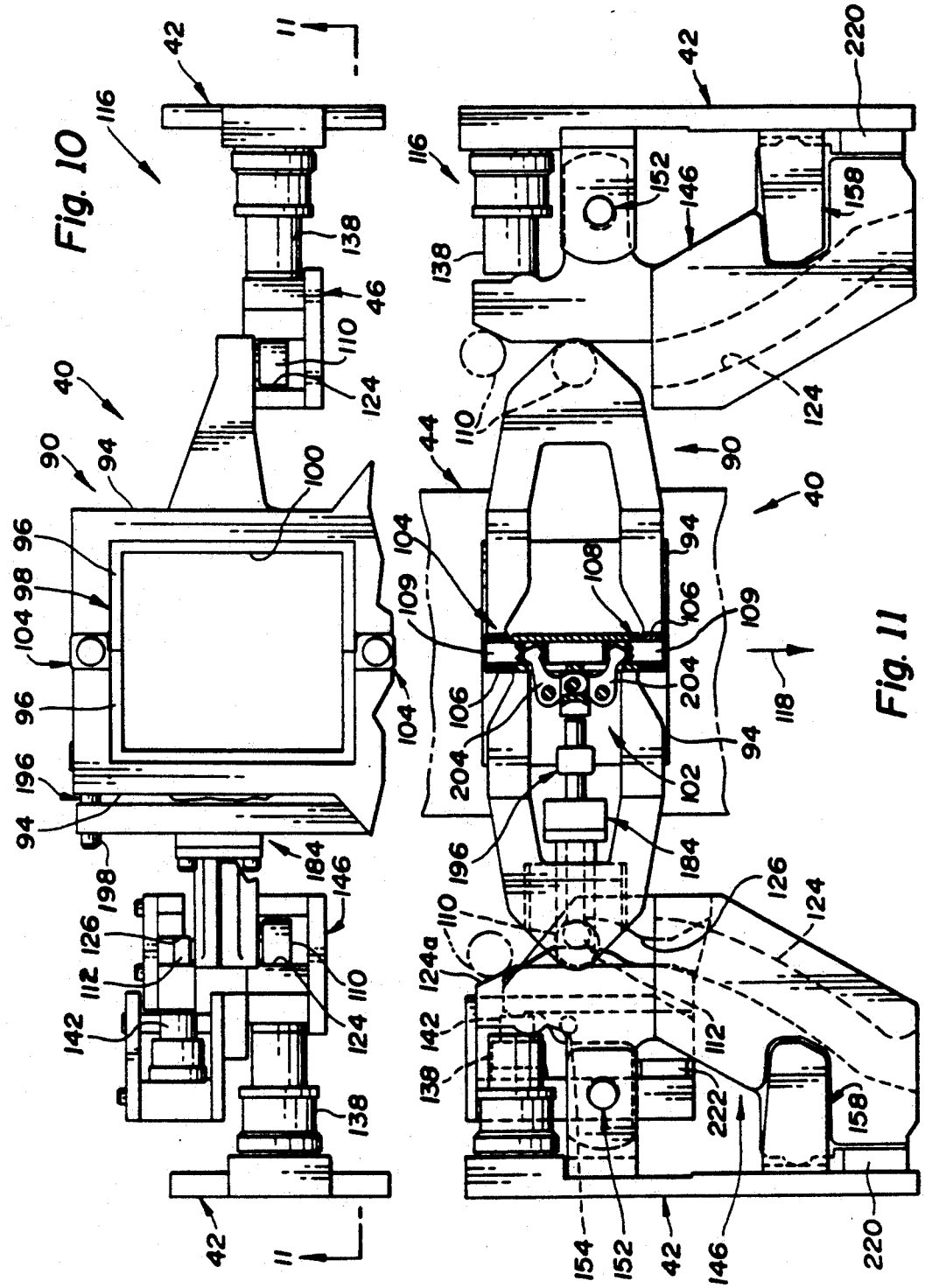

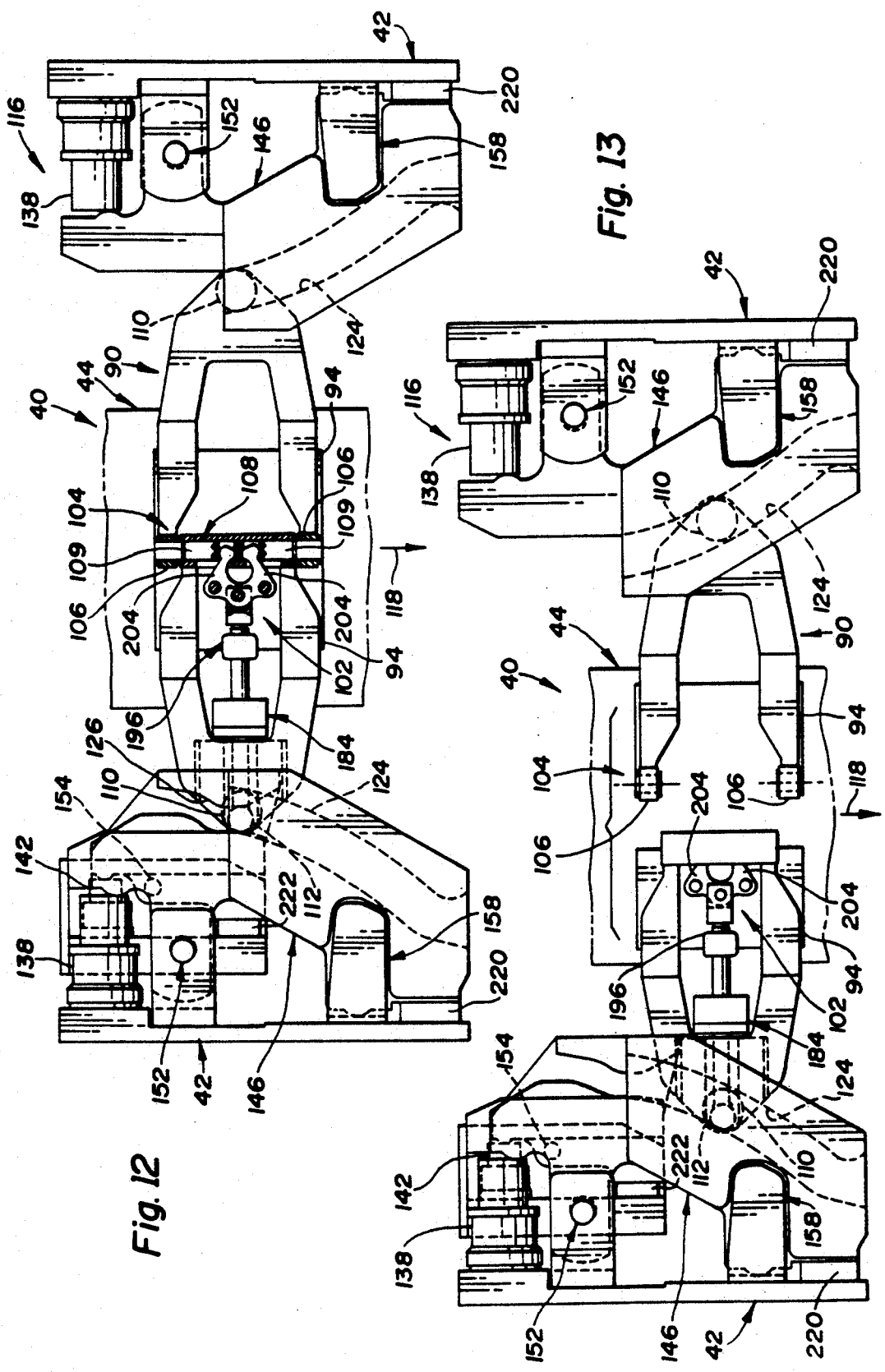

PLASTIC BLOW MOLDING MACHINE OF THE WHEEL TYPE

TECHNICAL FIELD

This invention relates to a plastic blow molding machine of the wheel type including a frame rotatable about a horizontal rotational axis with a plurality of mold stations mounted on the wheel frame about the rotational axis and each mold station having a pair of mold supports for mounting a pair of mold portions of a mold for movement parallel to the rotational axis between a mold open position where the mold portions are spaced from each other and a mold closed position where the mold portions define an enclosed cavity in which blow molding is performed.

BACKGROUND ART

Plastic blow molding machines of the wheel type, such as disclosed by U.S. Pat. Nos. 3,310,834 Simpson et al, 3,764,250 Waterloo, and 3,986,807 Takegami et al, have previously included a wheel having a frame supported on a base for rotation about a horizontal axis with a plurality of mold stations mounted on the wheel frame about the rotational axis such that a pair of mold supports for respectively mounting a pair of mold portions move parallel to the rotational axis between open and closed positions of the mold. Such blow molding machines conventionally include a closing station where the mold supports move the mold portions to a closed position to enclose an extruded hot plastic parison within a mold cavity for blowing to the shape of the mold and for subsequent cooling prior to opening at an opening station after approximately ¾ of a revolution of the wheel. Toggle and lock mechanisms which are normally spring biased have previously been cam operated to move the mold supports between the open and closed position in a manner that asymmetrically loads the wheel frame and eventually results in wear that requires maintenance.

Plastic blow molding machines of the wheel type wherein the mold supports move horizontally toward and away from each other between the open and closed positions are preferable in comparison to book-type molds that pivot between open and closed positions on a mold wheel such as disclosed by U.S. Pat. No. 3,608,015 Martelli. Such book-type molds on a wheel have more limited room in the open position to permit positioning of the parison between the open mold portions which can result in manufacturing problems.

DISCLOSURE OF INVENTION

An object of the present invention is to provide an improved plastic blow molding machine of the wheel type.

In carrying out the above and other objects of the invention, a plastic blow molding machine constructed in accordance with the present invention includes a base and a wheel having a frame supported on the base for rotation about a horizontal rotational axis. The frame includes at least two frame portions spaced horizontally from each other along the rotational axis. A plurality of mold stations are mounted on the wheel about the rotational axis, and each mold station includes at least one frame connecting member that extends between the frame portions of the wheel. Each mold station also includes a pair of mold supports for respectively mounting a pair of mold portions of a mold in which the plastic blow molding is to be performed. The pair of mold supports of each mold station are mounted on the connecting member thereof for movement parallel to the rotational axis between a mold open position where the mold portions are spaced from each other and a mold closed position where the mold portions define an enclosed cavity. Each mold station also includes a locking mechanism having a pair of locks respectively mounted on the mold supports on opposite sides of a mold supported thereby. Each lock includes a keeper on one of the associated mold portions and also includes a lock member that is mounted on the other associated mold support for movement to a lock position in engagement with the associated keeper of the one mold support to maintain the associated mold in the closed position. Each lock member is also movable to an unlocked position out of engagement with the keeper of the one mold support to permit movement of the mold supports and the mold mounted thereby to the open position. Each mold station also includes operating and locking cam followers for respectively moving its mold supports and its lock members. Closing and opening stations of the machine are spaced from each other on the base along the path of movement of the mold stations about the rotational axis as the wheel rotates about the rotational axis. The closing and opening stations each include associated operating and locking cams mounted on the base to respectively move the operating locking and cam followers of each mold station on the wheel. A drive of the machine rotates the wheel to move the mold stations past the closing and opening stations where the operating and locking cams moves the operating and locking cam followers to respectively close and open the molds on the mold supports and lock and unlock the lock members of the locking mechanisms of the mold supports. An extruder of the machine extrudes a hot plastic parison between the open mold portions prior to subsequent mold closing and blow molding in the enclosed mold cavity.

The manner in which the mold supports are moved on the wheel that rotates about the horizontal axis and are locked and unlocked by the keepers and lock members mounted on the mold supports prevents unsymmetrical loading of the wheel frame while still providing adequate space in the open position for the parison to be extruded between the mold portions mounted on the open mold supports prior to the closing for the blow molding.

The plastic blow molding machine includes at least one operating gas spring for biasing the operating cams of the closing and opening stations into camming positions to move the operating cam followers of the closing and opening stations into camming positions to move the operating cam followers and close and open the molds on the mold supports. The gas spring bias closes all of the molds on the mold supports of the wheel with a uniform force that is independent of cam follower, mold support and mold tolerances; and each operating cam is moved against the gas spring bias in case of malfunction of the molds. Furthermore, each closing and opening station also includes a locking gas spring for biasing the locking cam thereof to a camming position to move the locking cam followers of the mold stations and thereby move the lock members between the locked and unlocked positions. Each locking cam is moved against the spring bias thereof in case of locking mechanism malfunction.

In its preferred construction, the plastic blow molding machine has each mold station provided with a pair of operating cam followers respectively mounted on the pair of mold supports, and the closing and opening stations each include a pair of operating cams that respectively move the pair of operating cam followers. The closing and opening stations also preferably each include a pair of the operating gas springs that respectively bias the pair of operating cams thereof to the camming positions with respect to the pairs of cam followers of the mold stations.

The preferred construction of the plastic blow molding machine also has each mold station on the wheel provided with a single locking cam follower associated with the mold support thereof on which the lock members are mounted to move the lock members between the locked and unlocked positions, and the closing and opening stations each include a single locking cam for moving the locking cam followers of the mold stations.

As preferably constructed, the plastic blow molding machine has the closing and opening stations each including a pair of support arms on which the pair of operating cams are mounted. In addition, the closing and opening stations each have the pair of operating gas springs thereof respectively biasing the pair of support arms thereof to position the operating cams thereon in the camming positions. The closing and opening stations each also have the single locking cam thereof mounted on the one of the support arms thereof, and the closing and opening stations each also have a single locking gas spring that extends between said one support arm thereof and the locking cam mounted thereon to bias the locking cam to the camming position. The support arms of each closing and opening station each have a pivotal connection for providing mounting thereof on the base, and the locking cam of each closing and opening station each has a pivotal connection for providing mounting thereof on the one support arm of the station on which the locking cam is located. The pair of support arms of the closing station each includes a lost motion connection that extends between the base and the support arm to locate the operating cam thereon in the camming position against the bias of the associated operating gas spring while also permitting movement against the bias of the associated operated gas spring as the mold is closed and upon malfunction of the mold supports. The pair of support arms of the opening station each includes a guide that extends between the base and the support arm to provide guiding in the movement thereof about the associated pivotal connection.

The plastic blow molding machine is also constructed to include three frame portions spaced horizontally from each other along the rotational axis. Two of the frame portions are end frame portions which are located on opposite sides of the other frame portion which is a central frame portion. Each mold station includes a pair of frame connecting members that extend between the end and central frame portions of the wheel frame and mount the mold support portions thereof for movement between the mold open and closed positions. Each mold station has a pinion supported for rotation on the central frame portion, and the mold support portions of each mold station each have an associated rack that is meshed with the pinion thereof to coordinate the movement of the mold support portions with each other. Each mold station preferably includes a pair of operating cam followers respectively mounted on the pair of mold supports thereof, and the closing and opening stations each including a pair of operating cams that respectively move the pair of operating cam followers of each mold station under the coordination of the pinion on the central frame portion and the racks that are respectively mounted on the pair of mold supports of the mold station. Each mold station also includes a single locking cam follower mounted on one mold support thereof on which the lock members are mounted to move the lock members between the locked and unlocked positions and each closing and opening station includes a single locking cam for moving the locking cam followers of the mold stations.

In the preferred construction, the pair of locks of the lock mechanism of each mold station each include a pair of keepers on the one mold support thereof and also has its lock member on the other mold support thereof constructed to include a pair of locking portions that respectively move between the locked and unlocked position into and out of engagement with the associated pair of keepers on the other mold support. The pair of locks of the locking mechanism of each mold station each also includes a pair of spaced lock member guides that respectively mount the pair of locking portions of the associated lock member on the associated mold support for movement between the locked and unlocked positions with respect to the associated pair of keepers on the other mold support.

In its preferred construction, the plastic blow molding machine also has each mold station constructed to include a yoke connector having a stem connected to the locking cam follower on the associated mold support and has a pair of spaced legs that extend from the stem on opposite sides of the mold station and are respectively connected to the pair of locks of the locking mechanism to provide movement of the lock members between the locked and unlocked positions.

The preferred construction also has the closing and opening stations each provided with a pair of operating gas springs for respectively biasing the pair of operating cams thereof to the camming position, and the closing and opening stations each include a single locking gas spring for biasing the single locking cam thereof to the camming position. The closing and opening stations as previously mentioned each include a pair of support arms on which the pair of operating cams are mounted, and the closing and opening stations each have the pair of operating gas springs thereof respectively biasing the support arms thereof to position the operating cams thereon in the camming positions. The closing and opening stations as was also previously mentioned each have the single locking cam thereof mounted on one of the support arms thereof, and the closing and opening stations each have the single locking gas spring thereof extending between the one support arm thereof and the locking cam mounted thereon to bias the locking cam to the camming position. The support arms of each closing and opening station each have a pivotal connection for providing pivotal mounting thereof on the base as previously mentioned, and the locking cam of each closing and opening station has a pivotal connection for providing mounting thereof on the one support arm of the station on which the locking cam is located. Each of the pair of support arms of the closing station includes a lost motion connection that extends between the base and the support arm to locate the operating cam thereon in the camming position against the bias of the associated operating gas spring while also permitting movement against the bias of the associated operating gas spring as the mold is closed and upon malfunction of the mold supports. The pair of support arms of the opening station each includes a guide that extends between the base and the support arm to provide guiding in the movement thereof about the associated pivotal connection.

The objects, features and advantages of the present invention are readily apparent from the following detailed description of the best mode for carrying out the invention when taken in connection with the accompanying drawings.

BRIEF DESCRIPTION OF DRAWINGS

FIG. 8 is a view similar to FIG. 7 shown at a later stage of the cycle at the closing station after the mold station has been closed but while it is still in an unlocked condition;

FIG. 9 is a view similar to FIG. 8 at a still later stage of the cycle at the closing station after the mold station has been locked by a camming operation;

FIG. 10 is a view of an opening station of the machine taken along the direction of line 10—10 in FIG. 1 and rotated one-half revolution and illustrates the closed mold station prior to opening thereof for removal of the blow molded product;

FIG. 11 is a view taken along the direction of line 11—11 in FIG. 10 to further illustrate the machine construction at the opening station with the mold station both locked and closed;

FIG. 12 is a view similar to FIG. 11 at a later stage at the opening station after the mold station has been unlocked by a camming operation but while it is still in a closed condition;

FIG. 13 is a view similar to FIG. 12 at a still later stage of the cycle at the opening station after the mold station has been opened by a camming operation;

BEST MODE FOR CARRYING OUT THE INVENTION

Figure 1:
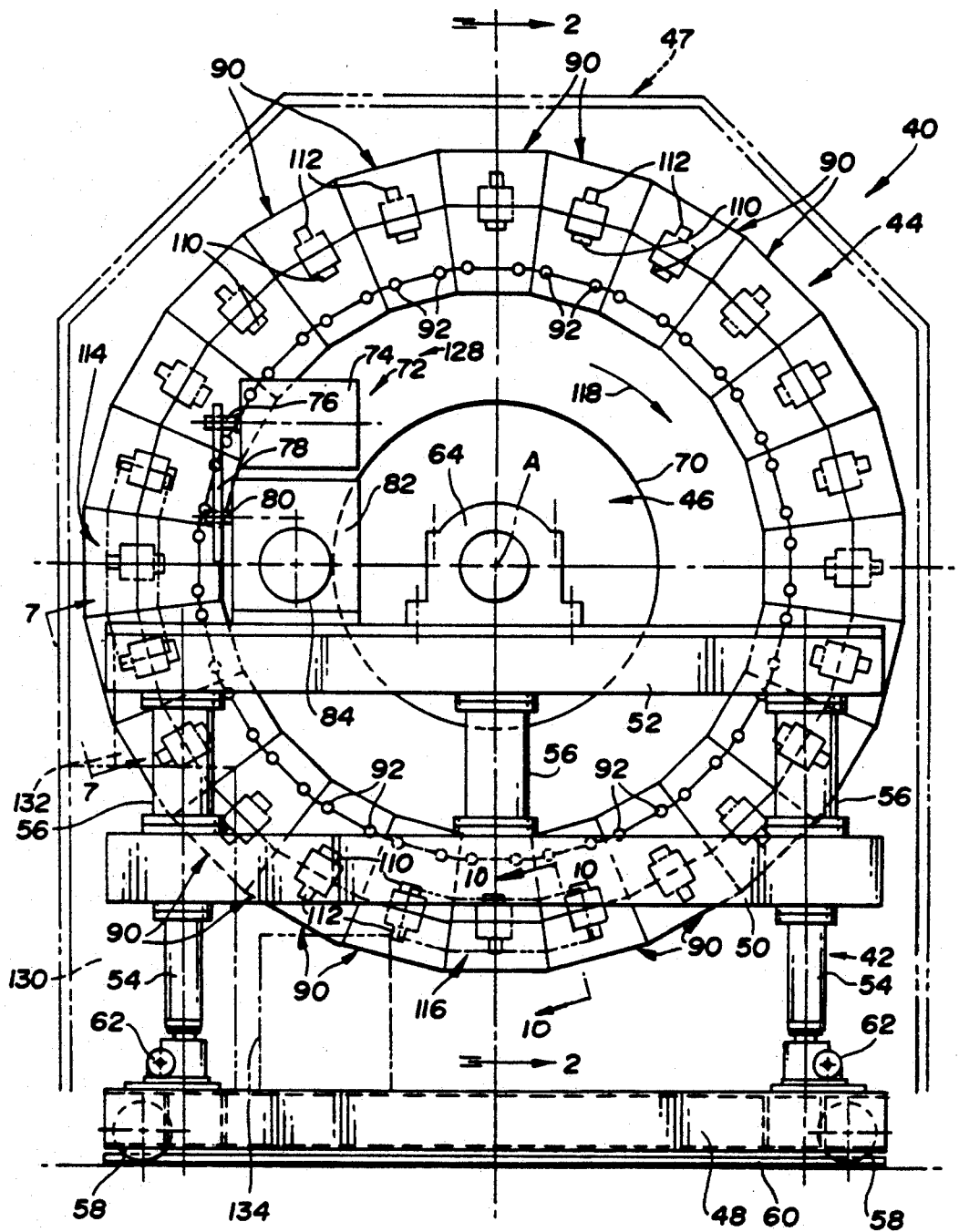
FIG. 1 is a side elevational view of a wheel type plastic blow molding machine constructed in accordance with the present invention.
Figure 2:
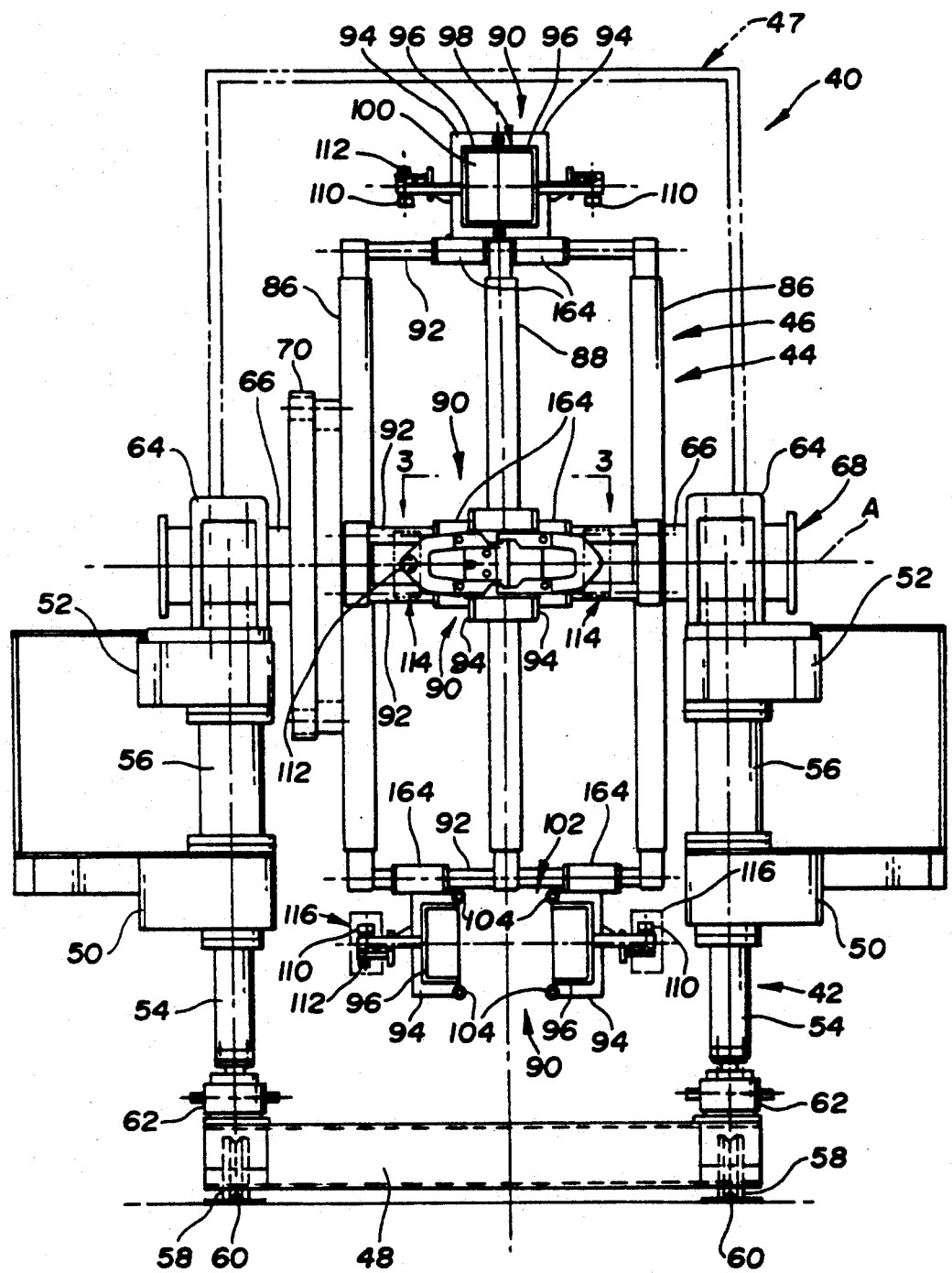
FIG. 2 is an elevational view taken generally along the direction of line 2—2 in FIG. 1 but only showing three of the mold stations so as to more clearly illustrate the construction involved.

With reference to FIGS. 1 and 2 of the drawings, a plastic blow molding machine constructed in accordance with the present invention is generally indicated by 40 and includes a base generally indicated by 42 and a wheel 44 having a frame 46 supported on the base for rotation about a horizontal rotational axis A within a housing 47 shown by phantom line representation. More specifically, the base 42 includes lower, intermediate and upper beams 48, 50 and 52 as well as including lower and upper legs 54 and 56 for providing support between the horizontal beams as illustrated. The lower beams 48 may include wheels 58 as illustrated for movement along associated tracks 60, and the lower legs 54 are illustrated as including adjustable jacks 62 for adjusting the beams to a horizontal position. Suitable bearings 64 on the upper beams 52 provide the rotatable support for the wheel frame 46 by supporting opposite ends 66 of a shaft 68. Adjacent the left shaft end 66 as illustrated in FIG. 2, the frame 46 includes a drive gear 70 driven by a suitable drive mechanism 72 mounted as shown in FIG. 1 on one of the upper beams 52. This drive mechanism 72 includes an electric drive motor 74 whose output 76 through a drive coupling 78 drives the input 80 of a gear reducer 82 whose output 84 is a gear that meshes with the drive gear 70 to rotate the machine wheel 44.

As illustrated in FIG. 2, the wheel frame 46 includes at least two spaced frame portions 86 spaced horizontally from each other along the rotational axis A and located as illustrated respectively adjacent the pair of bearings 64. As is hereinafter more fully described, there are actually three frame portions with the third frame portion designated as 88 and located at a central position between the two frame portions 86.

As shown in both FIGS. 1 and 2, the plastic blow molding machine 40 includes a plurality of mold stations 90 mounted on the wheel 44 about the rotational axis A as is hereinafter more fully described. As illustrated, there are twenty-four mold stations 90 mounted on the wheel 44, which is a relatively large number of mold stations as compared to conventional blow molding machines and thereby provides a relatively large output of the machine during use. Each mold station 90 as illustrated in FIG. 2 includes at least one frame connecting member 92 that extends between the frame portions 86 as well as the frame portion 88 and is suitably fixed thereto to provide the wheel frame 46 with rigidity. Each mold station 90 also includes a pair of mold supports 94 for respectively mounting a pair of mold portions 96 of a mold 98 in which blow molding is performed during operation of the machine as is hereinafter more fully described. The pair of mold supports 94 of each mold station 90 are mounted on the connecting members 92 thereof for movement parallel to the rotational axis A between a mold open position as illustrated by the lower position in FIG. 2 where the mold portions 96 are spaced from each other and a mold closed position illustrated by the upper portion of FIG. 2 where the mold portions 96 define an enclosed cavity 100 in which the blow molding takes place.

Figure 3:
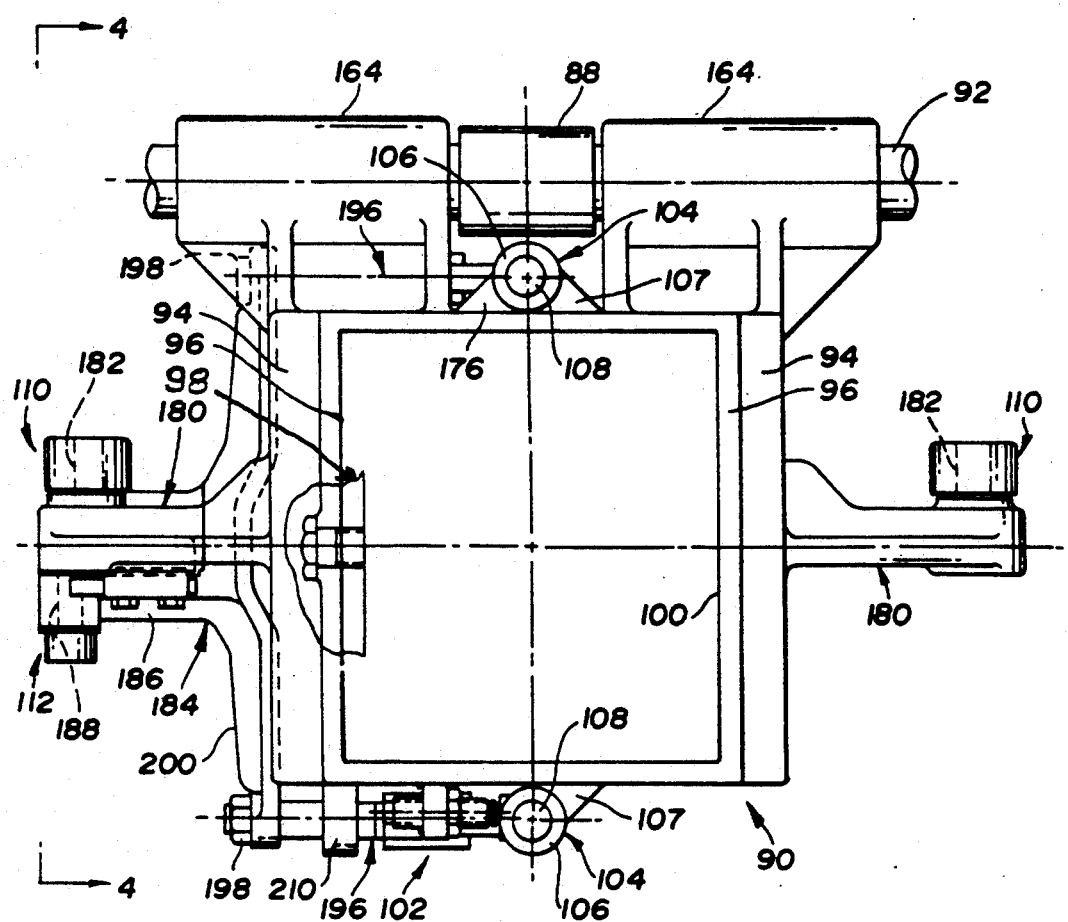
FIG. 3 is an enlarged view taken along the direction of line 3—3 in FIG. 2 to illustrate the mold station construction.
Figure 4:
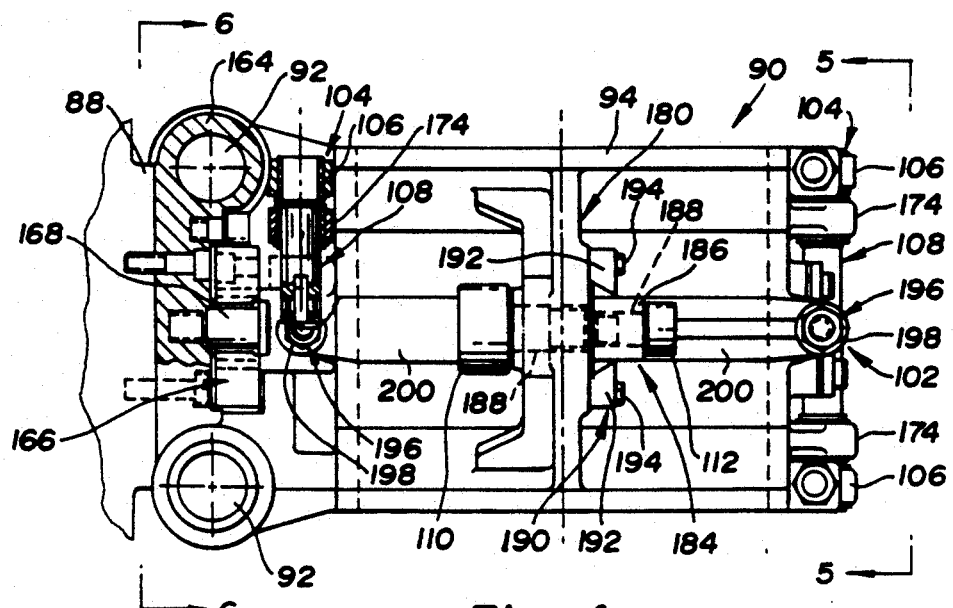
FIG. 4 is a partially sectioned view taken generally along the direction of line 4—4 in FIG. 3 to further illustrate the mold station construction.
Figure 5:
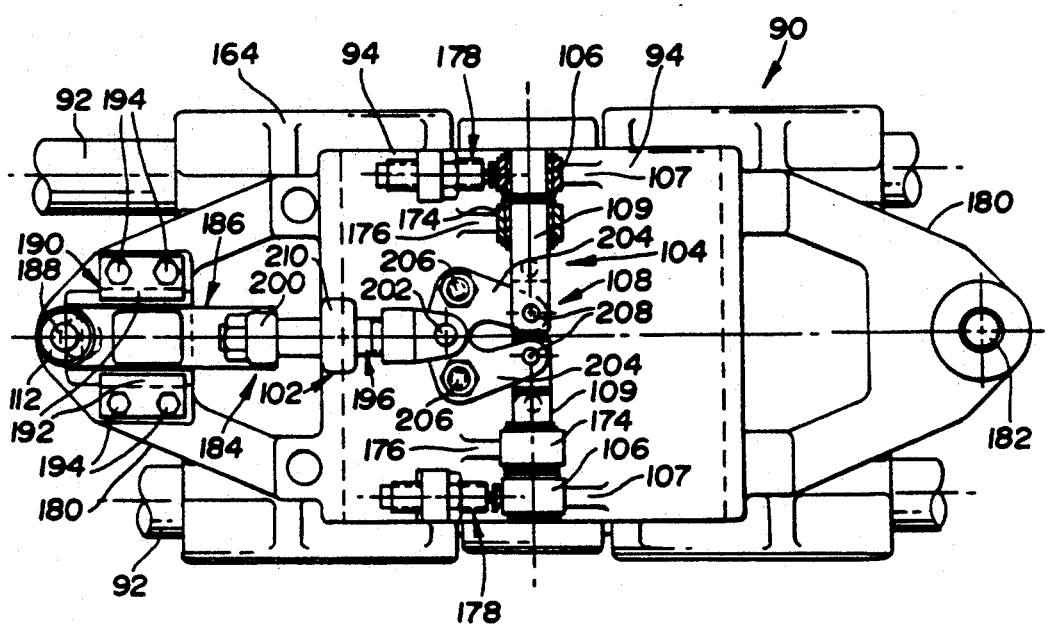
FIG. 5 is a view that further illustrates the mold station construction and is taken along the direction of line 5—5 in FIG. 4 in an inward radial direction with respect to the rotational axis of the machine wheel.
Figure 6:
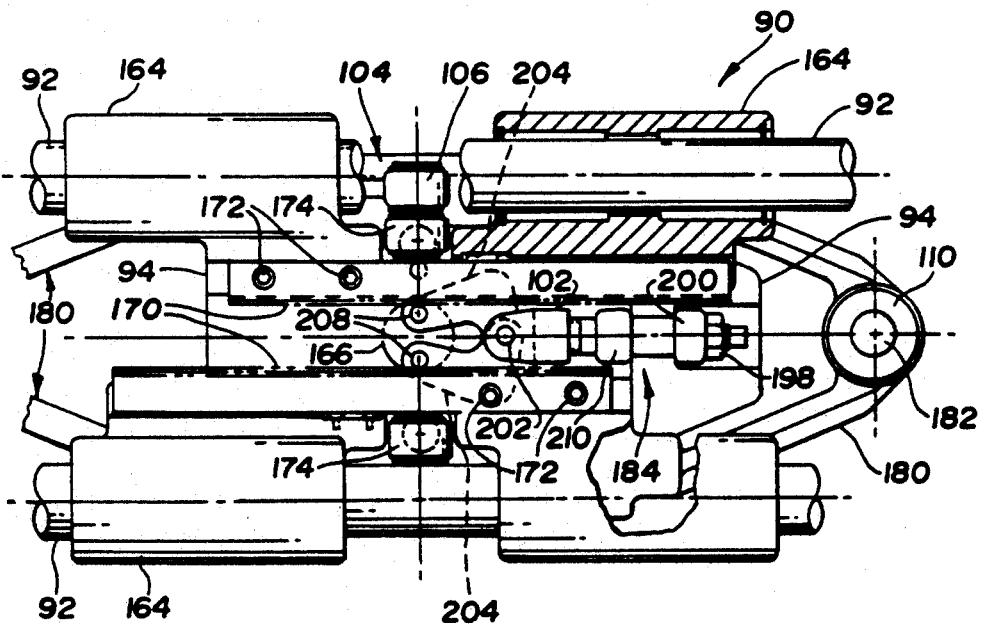
FIG. 6 is a view to further illustrate the mold station construction and is taken along the direction of line 6—6 in FIG. 4 which is an outward radial direction with respect to the rotational axis of the machine wheel.
Figure 7:
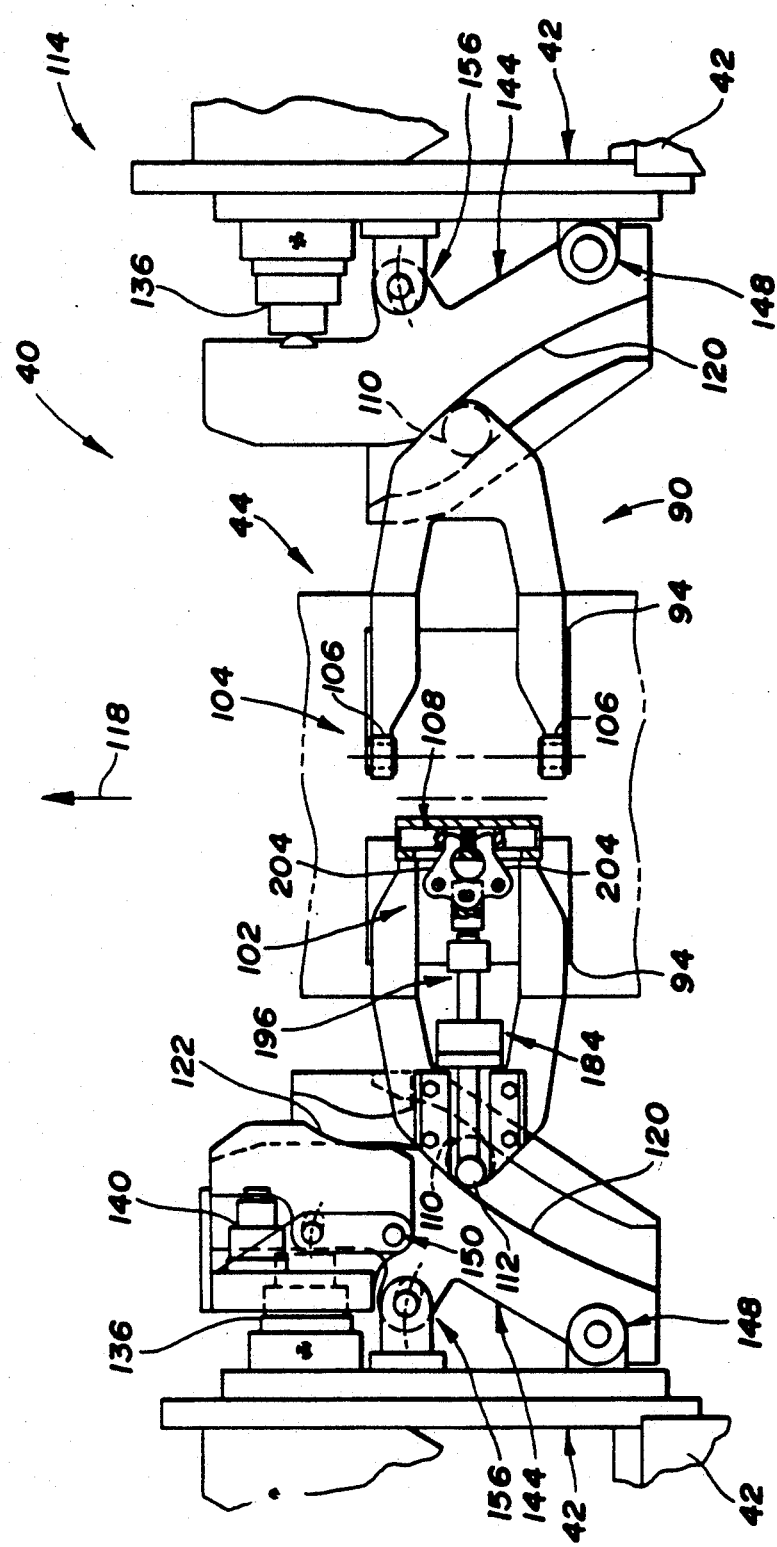
FIG. 7 is a view of the machine at a closing station taken along the direction of line 7—7 in FIG. 1 to illustrate the operation of the mold stations as closing thereof is commenced by a camming operation.

As illustrated by combined reference to FIGS. 2, 3 and 4, each mold station 90 includes a locking mechanism 102 having a pair of locks 104 respectively mounted on the mold supports 96 on opposite sides of the mold 98 supported thereby as previously described. Each lock 104 as shown in FIGS. 3-6 includes a keeper 106 on one of the associated mold supports 94, and each lock also has a lock member 108 that is mounted on the other associated mold support 94 for movement between locked and unlocked positions. More specifically, each lock member 108 is positionable in the locked position as illustrated in FIG. 9 in engagement with the associated keeper 106 of the one mold support 94 to maintain the associated keeper 106 of the one mold support to secure the mold mounted thereby in the closed position by locking the mold supports directly to each other. Furthermore, each lock member 108 is also movable to an unlocked position as shown in FIGS. 7 and 8 out of engagement with the keeper 106 on the one mold support to permit movement of the mold supports and the mold mounted thereby to the open position as is hereinafter more fully described.

As best illustrated in FIGS. 2 and 3, each mold station 90 has operating and locking cam followers 110 and 112, respectively, for respectively moving its mold supports 94 and its lock members 108 as is hereinafter more fully described. Closing and opening stations 114 and 116, respectively, of the machine are spaced from each other on the base 42 as schematically illustrated in FIG. 1 along the path of movement of the mold stations 90 about the rotational axis A as the wheel 44 rotates clockwise as shown by arrow 118. There is approximately ¾ of a revolution between the mold closing station 114 where the blow molding cycle commences as is hereinafter more fully described and the opening station 116 where the cycle is completed as the blow molded product is ejected for transfer by a suitable unshown conveyor for finishing. The closing station 114 as illustrated in FIGS. 7-9 includes operating cams 120 mounted on the machine base 42 to move the operating cam followers 110 as is hereinafter more fully described. The closing station as also shown in FIGS. 7-9 includes a locking cam 122 mounted on the machine base 42 as is hereinafter more fully described to move the locking cam followers 112 of the mold stations during operation of the machine. Opening station 116 as illustrated in FIGS. 10-13 includes operating cams 124 for moving the operation cam followers 110 of the mold stations 90 on the wheel during the machine operation. The opening station also includes a locking cam 126 for moving the locking cam followers 112 of each mold station 90 on the wheel during the machine operation.

A drive 128 is provided by the drive mechanism 72 previously described to rotate the wheel 44 clockwise as previously discussed in connection with FIG. 1 and as shown by arrow 118 to move the mold stations 90 past the closing and opening stations 114 and 116 where the operating and locking cams move the operating and locking cam followers to respectively close and open the molds on the mold supports and lock and unlock the lock members of the lock mechanisms of the mold supports. A schematically indicated extruder 130 of the machine is of any conventional construction for extruding a hot plastic parison 132 upwardly between the open mold portions prior to subsequent mold closing at the closing station 114 and blow molding in the enclosed mold cavity. Cooling then takes place during the ⅔ or so of a revolution before the mold station 90 involved reaches the opening station 116 for the mold opening and ejection of the blow molded product. It is also possible to utilize an in-mold labeler 134 downstream from the opening station 116 to supply one or more labels to each mold station prior to reaching the closing station 114 where the mold is closed in preparation for the blow molding of the parison.

Both the closing and opening stations 114 and 116 include gas springs for biasing the cams thereof into camming positions as is hereinafter more fully described. More specifically, the closing station 114 as illustrated in FIGS. 7-9 includes operating gas springs 136 for biasing the operating cams 120 into camming positions to move the operating cam followers 110 and thereby close the molds on the mold supports during the machine operation. Likewise, the opening station 116 as illustrated in FIGS. 10-13 includes operating gas springs 138 for biasing the operating cams 124 into camming positions to move the operating cam followers 110 for opening of the molds on the mold supports during the machine operation. Each operating cam is moved against the gas spring bias at both the closing and opening stations in case of malfunction of the mold supports. The gas spring bias at the closing station closes all of the molds on the mold supports of the wheel with a uniform force that is independent of a cam follower, mold support, mold and other tolerances so as to thereby provide more uniform quality, specifically the same pinch force is applied to the parison upon closing of each mold so that trimming of flash can be performed more uniformly. The closing and opening stations 114 and 116 also include locking gas springs 140 and 142, respectively, for biasing the locking cams 122 and 126 into camming positions to move the locking cam followers 112 of the mold stations and thereby move the lock members 108 between the locked and unlocked positions as previously described. Each locking cam 122 and 126 is moved against the gas spring bias thereof in case of locking mechanism malfunction so as to thereby prevent damage to the machine. Both the operating gas springs 136 and 138 and the locking gas springs 140 and 142 are of any conventional type and are filled with a suitable pressurized gas such as nitrogen so as to provide the gas spring bias of the cams.

As best illustrated in FIGS. 2 and 3, each mold station 90 includes a pair of operating cam followers 110 respectively mounted on the pair of mold supports 94. Furthermore, the closing station 114 illustrated schematically in FIG. 1 includes a pair of the operating cams 120 (FIG. 7) that respectively move the pair of operating cam followers 110 of each mold station 90 during machine operation, and the opening station 116 shown schematically in FIG. 1 also includes a pair of the operating cams 124 (FIGS. 10 and 11) that respectively move the pair of operating cam followers 110 of each mold station 90 during machine operation. These pairs of operating cams 120 and 124 of the closing station 114 illustrated in FIG. 7 through 9 and the opening station 116 illustrated in FIG. 10 through 13 are located on opposite sides of the machine wheel 44 so that the wheel rotation moves the mold stations 90 between the pairs of operating cams to move the mold supports 94 between the open and closed positions and to also operate the lock mechanism 102 of each mold station so as to move the lock member 108 of each lock 104 as is hereinafter more fully described. Both the closing and opening stations 114 and 116 schematically illustrated in FIG. 1 include a pair of the operating gas springs 136 and 138, respectively, as shown in FIGS. 7-9 and FIGS. 10-13 to provide biasing of the associated operating cams 120 and 124 to the camming positions with respect to the pair of operating cam followers 110 of the mold stations on opposite sides of the rotating wheel. Thus, the operating gas springs 136 and 138 of the closing and opening stations on one side of the wheel provide biasing of the associated operating cams in one direction and the operating gas springs 136 and 138 of the closing and opening stations on the other side of the wheel provide biasing of the operating cams in the opposite direction.

As best illustrated in FIG. 3, each mold station 90 of the wheel preferably includes a single locking cam follower 112 associated with one of the mold supports thereof on which the lock members 108 thereof are mounted to move the lock members between the locked and unlocked positions as previously described. As illustrated in FIGS. 7-9, the closing station 114 has a single locking cam 122 that is located on the one side of the wheel to operate the locking cam followers 112 of the mold stations. Likewise, as shown in FIGS. 10-13, the closing station 116 has a single locking cam 126 for operating the locking cam followers 112 of the mold stations.

Both the closing and opening stations 114 and 16 each include a pair of support arms on which the operating cams are mounted. More specifically, as illustrated in FIGS. 7-9, the closing station 114 includes a pair of support arms 144 mounted on the machine base 42 as is hereinafter more fully described with the operating cams 120 thereon to move the operating cam followers 110 of the mold stations as previously described. Likewise, as illustrated in FIGS. 10-13, the opening station 116 includes a pair of support arms 146 mounted on the machine base 42 as is hereinafter more fully described with the operating cams 124 thereof mounted thereon to move the operating cam followers 110 of the mold stations as previously described. The pair of operating gas springs 136 of the closing station 114 illustrated in FIGS. 7-9 bias the pair of support arms 144 thereof to position the operating cams 120 for camming of the operating cam followers 110 on the mold stations to provide mold closing. Likewise, the pair of operating gas springs 138 of the opening station 116 illustrated in FIGS. 10-13 bias the pair of support arms 146 thereof to position the operating cams 124 for camming of the operating cam followers 110 on the mold stations to provide mold opening.

As illustrated in FIGS. 7-13, the closing and opening stations 114 and 116 each have the single locking cam 122 and 126 thereof, respectively, mounted on one of the support arms thereof to perform the camming operation. More specifically, as illustrated in FIGS. 7-9, the closing station 114 has the single locking cam 122 thereof mounted on the left support arm 144 with the single locking gas spring 140 thereof extending between the left support arm 144 and the locking cam mounted thereon to bias the locking cam to the camming position with respect to the locking cam followers 112 of the molds stations. Likewise, as illustrated in FIGS. 10-13, the closing station 116 has its single locking cam 126 mounted on the left support arm 146 with its single locking gas spring 142 extending between this left support arm and the locking cam 126 mounted thereon to bias the locking cam to the camming position with respect to the locking cam followers 112 of the mold stations.

As illustrated in FIGS. 7-13, pivotal connections provide mounting of the support arms on the machine base and mounting of the locking cams on the support arms. More specifically as illustrated in FIGS. 7-9, the closing station 114 has each of its support arms 144 supported on the machine base 42 by an associated pivotal connection 148 at one end of the support arm. Furthermore, the left support arm 144 of the closing station as illustrated in FIGS. 7-9 has a pivotal connection 150 that pivotally mounts the locking cam 122 for movement on the other end of the left support arm under the bias of the locking gas spring 140. Likewise, as illustrated in FIGS. 10-13, the opening station 116 has its support arms 146 each provided with an associated pivotal connection 152 for providing mounting thereof on the machine base 42 generally intermediate the ends of the support arm. Furthermore, the left support arm 146 of the closing station has a pivotal connection 154 that mounts the single locking cam 126 of the closing station on the left support arm with the locking gas spring 142 providing biasing thereof into the camming position with respect to the locking cam followers 112 of the mold stations.

As illustrated in FIGS. 7-9, the pair of support arms 144 of the closing station 114 each includes a lost motion connection 156 that permits the associated operating gas spring to position the support arm 144 so that the operating cam 120 thereof is positioned for camming operation that closes the molds of the mold stations with a uniform force while also permitting movement against the gas spring bias during such mold closing and in case of malfunction. Thus, the support arms 144 are biased inwardly toward each other by the associated operating gas springs 136 to the maximum extent permitted by the associated lost motion connections 156 so as to be capable of camming the molds closed as previously described. Nevertheless, the support arms 144 can pivot away from each other in case the molds do not move as intended so as to allow the wheel rotation to be stopped without damage.

As illustrated in FIGS. 10-13, the pair of support arms 146 of the closing station 116 each have an associated guide 158 that extends between the base and the support arm to provide guiding in the movement thereof about the associated pivotal connection 152.

Figure 21:
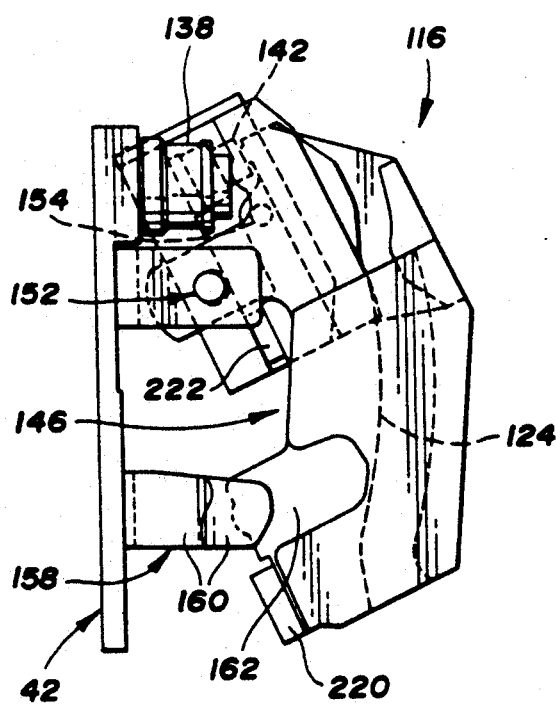
FIG. 21 is a view similar to FIGS. 19 and 20 of the cam construction at the opening station but illustrates the cam construction moved to a position by malfunction of the opening of the mold station.

More specifically, as illustrated in FIG. 21, each guide 158 includes a pair of spaced guide members 160 between which a guided portion 162 of the support arm 146 is located so as to cooperate with the pivotal connection 152 in locating the support arm during its movement as is hereinafter more fully described.

As previously mentioned in connection with FIG. 2, the wheel frame 46 includes three frame portions spaced horizontally from each other along the rotational axis A, with two of the frame portions being end frame portions 86 which are located on opposite sides of the other frame portion which is a central frame portion 88. Furthermore, each mold station 90 as illustrated by combined reference to FIGS. 1, 2, 5 and 6 includes a pair of the frame connecting members 92 that are round rods extending between the end and central frame portions 86 and 88 of the wheel frame 46 and mount the mold support portions 94 thereof for movement between the mold open and closed positions as illustrated by the lower and upper portions of FIG. 2. As illustrated in FIGS. 3–6, each of the mold supports 94 includes a pair of mounting slides 164 that respectively receive the frame connecting members 92 to provide mounting thereon for movement of the mold supports toward and away from each other between the mold open and closed positions. As illustrated in FIGS. 3 and 4, the central frame portion 88 is located between the mounting slides 164 associated with the pair of mold supports 94 of the associated mold station 90 and has a pinion 166 rotatably mounted thereon about a pinion shaft 168 whose axis extends radially with respect to the rotational axis of the wheel. This pinion 166 has gear teeth that project radially outward from the shaft 168. As shown in FIG. 6, each of the mold supports 94 has an associated rack 170 that is mounted thereon such as by the bolts 172 shown and has teeth that mesh with the teeth of the pinion 166 to coordinate the movement of the mold support portions with each other. Thus, the meshing of the pinion 166 with the racks 170 ensures that the mold supports 94 close the mold of each mold station at a central location with respect to the wheel so that an unsymmetrical condition does not result in a manner that could adversely affect the quality of the blow molded product. The operating cam followers 110 of each mold station and the operating cams 120 and 124 of the closing and opening stations thus cooperate with the pinion 166 on the central frame portion and the pair of racks 170 respectively mounted on the pair of mold supports 94 to coordinate the mold movement between the mold open and closed positions as previously described.

As previously mentioned in connection with FIG. 3, each mold station 90 includes a single locking cam follower 112 mounted on the mold support 94 thereof on which the lock members 108 are mounted to move the lock members between the locked and unlocked positions, and each of the closing and opening stations includes a single locking cam 122 and 126, respectively, for moving the locking cam followers 112 of the mold stations. The pair of locks 104 of the locking mechanism 102 of each mold station as illustrated by combined reference to FIGS. 3 and 5 each include a pair of the keepers 106 whose mounting is reinforced by an associated rib 107 on the associated mold support. Furthermore, each lock member 108 as best illustrated in FIG. 5 is constructed to include a pair of lock member portions 109 that respectively move between the locked and unlocked positions into and out of engagement with the pair of keepers 106 during movement between the locked position illustrated in FIG. 9 and the unlocked position illustrated in FIG. 8. The pair of locks 104 of each mold station 90 as best illustrated in FIGS. 4 and 5 each includes a pair of spaced lock member guides 174 that respectively mount the pair of locking portions 109 of the associated lock member 108 on the associated mold support 94 for movement between the locked and unlocked positions with respect to the pair of keepers 106 mounted on the other mold support 94. Ribs 176 reinforce the mounting of the guides 174 on the associated mold support 94. Suitable sensors 178 which are preferably adjustable are mounted on the one mold support and are actuated by mold closing upon engagement with the keepers 106 to provide a signal that the mold closing has taken place in order to monitor operation during use of the machine.

As illustrated by combined reference to FIGS. 3 and 5, each mold support 94 includes a projecting arm 180 that supports a shaft 182 (FIG. 3) on which the operating cam follower is mounted for rotational movement so that rolling takes place upon engagement thereof with the associated operating cams to facilitate the camming operation. Each mold station also has its one mold support 94 on which the locking cam follower 112 is mounted provided with a yoke connector 184. As shown in FIG. 4, the yoke connector 184 has a stem 186 including a shaft 188 on which the locking cam follower 112 is rotatably mounted so as to engage the locking cams of the closing and opening stations with rolling contact in order to facilitate the camming operation of the locking and unlocking. Stem 186 of the yoke is mounted on the outer end of the associated arm 180 by a slideway 190 including a pair of slideway members 192 secured to the arm by associated bolts 194. Locking cam follower 112 is thus supported on the stem 186 of the yoke 184 for movement with respect to the associated mold support 94 to perform the locking and unlocking operation by the cam actuation previously described. Yoke 184 also includes a pair of spaced legs 196 that extend from the stem on opposite sides of the mold station and are respectively connected to the pair of locks 104 of the locking mechanism 102 to provide movement of the lock members 108 between the locked and unlocked positions. More specifically, as illustrated in FIG. 3, each leg 196 has one end secured by an associated nut 198 to a stem member 200 and has another end secured as shown in FIG. 5 by a pin 202 to a pair of connection members 204 which are pivotally mounted by associated pins 206 on the associated mold support. Connection members 204 are each connected by an associated pin 208 to one of the lock member portions 109 of the lock member 108. Between its opposite ends, each leg 196 extends through a guide 210 on the associated mold support 94 so that the cam actuated movement of the yoke connector 184 through the connection members 204 provides movement of the lock member portions 109 between the unlocked position of FIG. 5 and the locked position illustrated in FIG. 9.

Figures 14, 15:
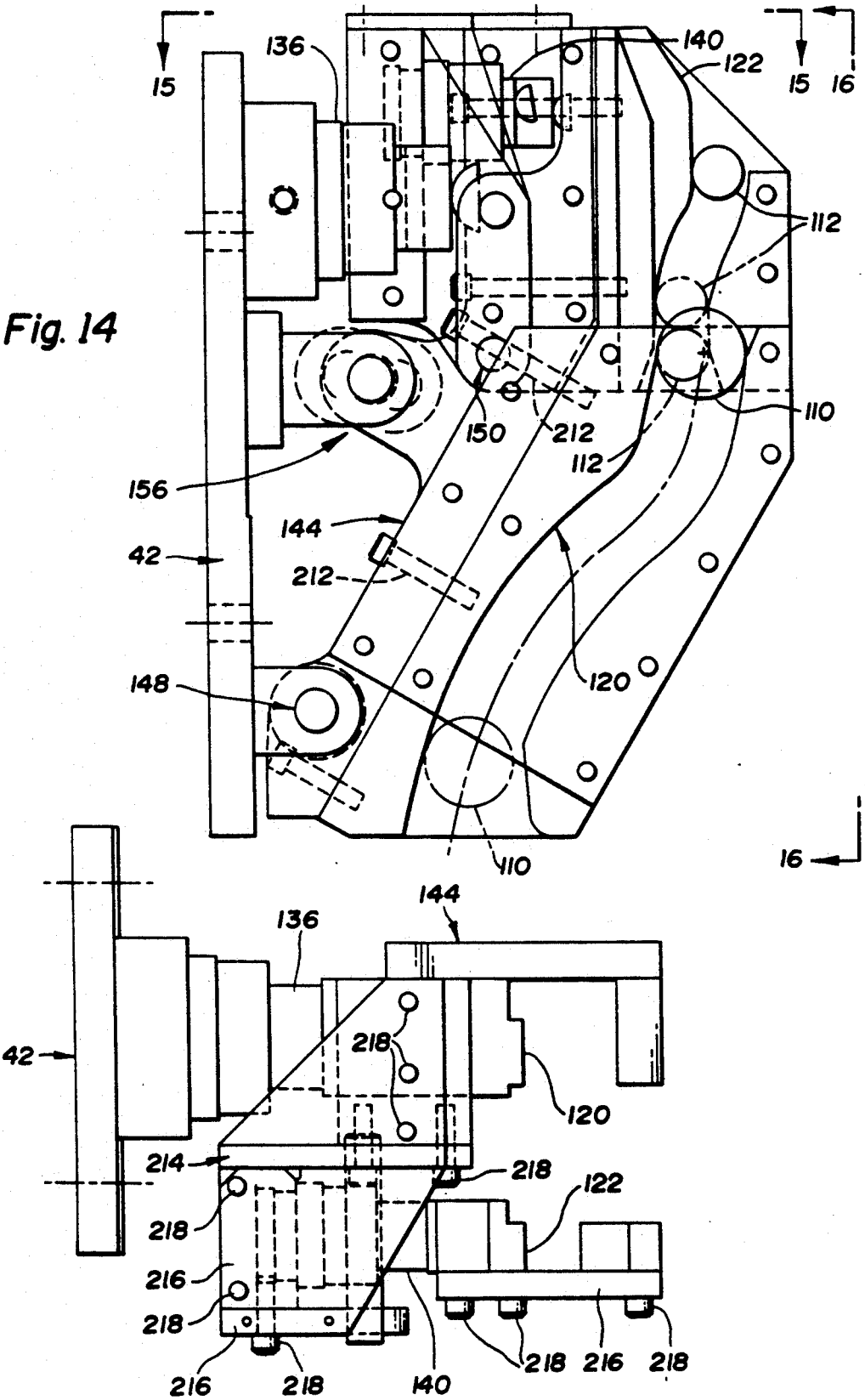
FIG. 14 is an enlarged view of the cam construction of the machine at the closing station illustrated in FIGS. 7, 8 and 9.
FIG. 15 is a further view of the cam construction at the closing station taken along the direction of line 15—15 in FIG. 14.
Figure 16:
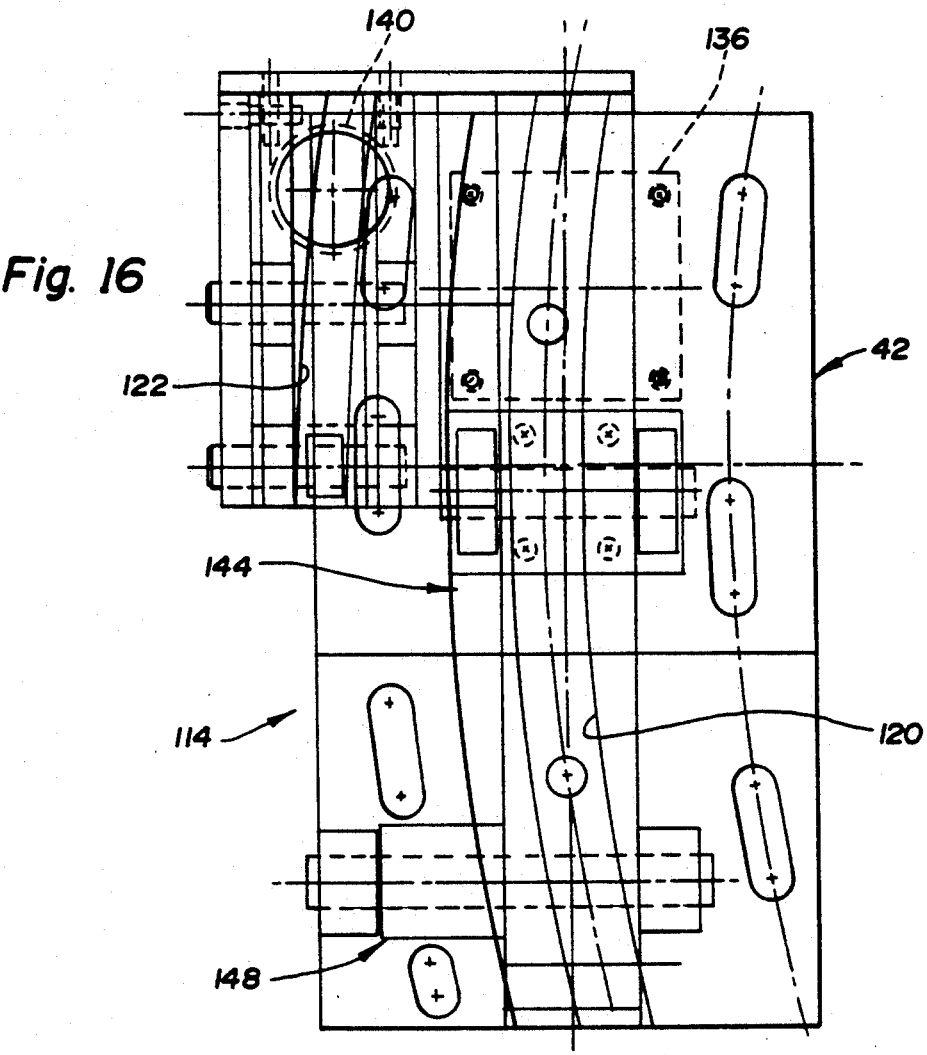
FIG. 16 is a further view of the cam construction at the closing station taken along the direction of line 16—16 in FIG. 14.

With reference to FIGS. 14, 15 and 16, the support arm 144 of the closing station is illustrated as having a fabricated construction including bolts 212 (FIG. 14) that secure the operating cam 120 so that different cam configurations can be utilized to provide different paths of movement as may be required for any particular blow molding operation. In a spaced relationship from the pivotal connection 148 that mounts the support arm 144 on the base 42, the lost motion connection 156 allows pivoting of the support arm against the bias of the operating gas spring 136 that normally biases the support arm clockwise to the extent permitted by the lost motion connection. However, the operating gas spring 136 permits pivoting movement of the support arm 144 about pivotal connection 148 in case of machine malfunction and also applies a uniform force to the mold during closing despite any tolerance variations.

As illustrated in FIG. 15, the support arm 144 includes a bracket 214 that extends from the operating cam 120 and supports the locking cam 122 and the locking gas spring 140 as previously described such that the locking cam is positioned for the camming operation of the locking mechanism under a gas spring bias. This bracket 214 includes plates 216 and connection bolts 218 for positioning the operating and locking cams 120 and 122. The other support arm of the closing station 114 has a similar construction except that there is no locking cam and associated locking gas spring thereon as previously mentioned.

As illustrated in FIG. 16, the operating cam 120 of the closing station and the locking cam 122 of the closing station actually have arcuate shapes about the rotational axis of the wheel to accommodate for the arcuate movement of the cam followers on the wheel. Likewise, the operating cams and the locking cam of the opening station also have such arcuate shapes about the rotational axis of the wheel to accommodate for the arcuate movement of the cam followers on the wheel.

Figure 17:
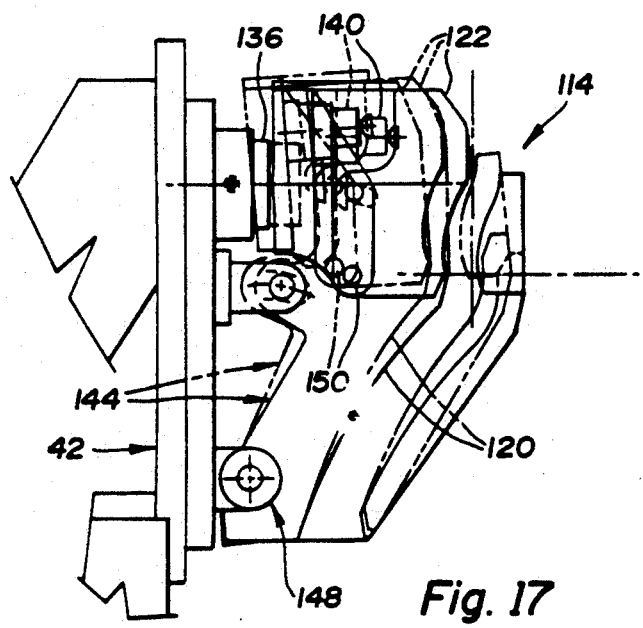
FIG. 17 is a view similar to FIG. 14 which illustrates movement of an operating cam in order to accommodate for malfunction of the mold station being cammed thereby.

As illustrated in FIG. 17, the support arm 122 of the closing station moves from the solid line position to the phantom line position against the bias of the operating gas spring 136 by resistance to mold closing through the camming operation previously described and thereby accommodates for malfunction of the machine. Furthermore, the bias of the operating gas spring ensures that there is uniform force in closing of the mold so that there is uniformity in the resultant blow molded product as previously discussed.

Figure 18:
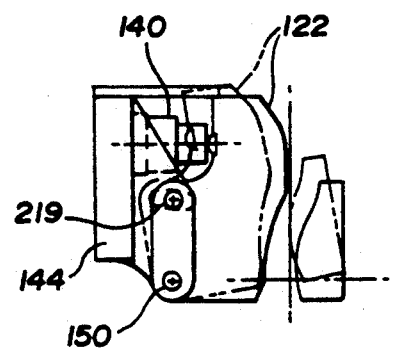
FIG. 18 is a view of a portion of the cam construction at the closing station that illustrates operation of a locking cam to accommodate for malfunction of a lock mechanism of the mold station.

As illustrated in FIG. 18, the locking cam 122 of the closing station moves from the solid line position to the phantom line position in case of malfunction of the locking mechanism to thereby prevent any damage to the machine which can be equipped with an automatic shutdown operation through suitable sensors that respond to such movement. This movement of the locking cam is about its pivotal connection 150 to the associated support arm 144. A lost motion connection 219 positions the locking cam 122 against the bias of the locking gas spring 140 while permitting the locking cam movement about the pivotal connection 150 when there is malfunction of the locking mechanism of one mold station.

Figure 19:
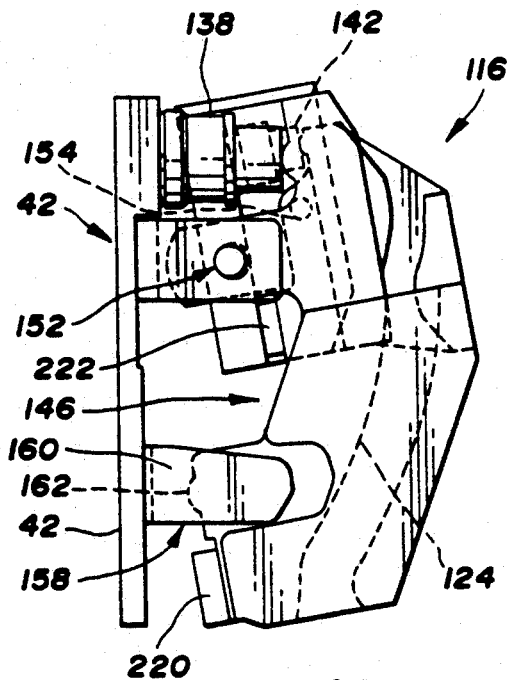
FIG. 19 is a view of the cam construction at the opening station with the cams moved by an overload.

With reference to FIG. 19, the one support arm 146 of the opening station on which the locking cam 126 is mounted is shown moved by an overload condition. Such an overload condition causes the support arm 146 to pivot in a counterclockwise direction about the pivotal connection 152 on the base against the bias of the operating gas spring 138 as previously described. During such movement, the guide 158 on the opposite side of the pivotal connection 152 from the operating gas spring 138 provides a guiding movement of the support arm as well as providing a guiding movement upon return under the bias of the operating gas spring 138 to a position where a resilience stop to 220 engages the adjacent surface of the machine base 42.

Figure 20:
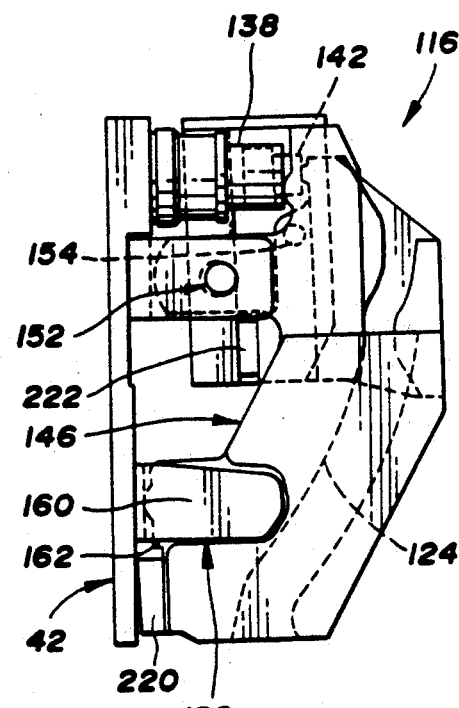
FIG. 20 is a view of the cam construction at the opening station illustrating movement as a result of flash between mold support portions of the mold station.

As illustrated in FIG. 20, the opening station support arm 146 can also move in another mode of movement against the gas spring bias when flash between the molds prevents complete mold closing. More specifically, the pivotal connection 152 allows a slight amount of movement to accommodate for the lack of complete mold closing. This amount of movement is on the order of about ⅛ of an inch for each opening station support arm 146 such that the total of the two support arms on opposite sides of the wheel permits about ¼ inch of total movement in this mode.

As illustrated in FIG. 21, the opening station support arm 146 is shown moved against the bias of the operating gas spring 138 to accommodate for malfunction in the mold opening without a resultant damage to the associated mold station. Suitable sensing of this movement and machine stoppage can also be utilized to prevent any damage to the blow molding machine.

Figure 22:
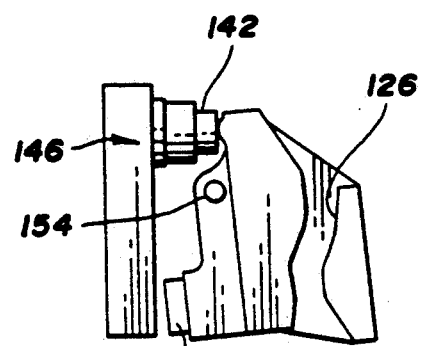
FIG. 22 is a view of a portion of the cam construction at the opening station to illustrate a locking cam that is moved by malfunction of the lock mechanism of the mold station.

As illustrated in FIG. 22, the locking cam 126 is shown moved against the bias of the locking gas spring 142 by pivoting thereof in response to locking mechanism malfunction in a counterclockwise direction about pivotal connection 154 such that a resilient stop 222 thereof moves out of engagement with the adjacent surface of the support arm 146. The associated locking gas spring 142 thus normally biases the locking cam 126 so that stop 222 seats against the support arm 146.

With reference to FIG. 1, a complete cycle of the blow molding machine constitutes an entire revolution beginning after the particular mold station 90 involved leaves the closing station 116 subsequent to completion of the prior cycle. If in-mold labeling is to be performed, one or more labels is then applied to the open mold by the in-mold labeler 134 previously described. The open mold station 90 then proceeds to rotate clockwise toward the closing station 114 as the hot plastic parison 56 is extruded between the spaced portions of the open mold.

As each mold station 90 reaches the closing station 114 as illustrated in FIG. 7, the stationary operating cams 120 engage the moving operating cam followers 110 on the mold supports 94 of the mold station. Continued movement of the mold station on the wheel which is in an upward direction as illustrated by arrow 118 thus causes the mold supports 94 to move toward each other until mold closing takes place as shown in FIG. 8 to thus enclose the plastic parison within the mold. The operating gas springs 136 of the closing station apply a uniform pressure through the support arms 144, the operating cams 120, and the operating cam followers 110 so that the mold supports 90 close the associated mold with a pressure that is the same from one mold station to the next.

In the FIG. 8 position, the mold station 90 is illustrated in the mold closed position but the lock mechanism 102 thereof is still unlocked. As the wheel 44 continues to rotate in the direction shown by arrow 118 from the FIG. 8 position to the FIG. 9 position, the locking cam 122 engages the locking cam follower 112 to move the lock member 108 to its locked position in engagement with the keeper 106. As previously discussed, this locking takes place as the lock member portions 109 of each lock member 108 are moved by the yoke connector 184 along the associated guide 174 (FIG. 5) in opposite directions from each other into engagement with the associated keeper 106 so that the mold supports 90 are directly locked to each other without applying any other load to the wheel frame that supports the mold station as previously described. Blow molding of the enclosed parison within the closed and locked mold then takes place and the blow molded product cools as the rotation proceeds from the closing station 114 shown in FIG. 1 for about ⅔ of a revolution in the clockwise direction to the opening station 116.

As each mold station 90 initially reaches the closing station 116 during the clockwise rotation shown by arrow 118, the initial camming operation that takes place is illustrated in FIG. 11 as the operating cam portion 124a engages the phantom line indicated operating cam 110 to release the pressure on the locking mechanism in holding the mold closed. Subsequently, the continued rotation of the wheel causes the locking cam 126 of the closing station to engage the locking cam follower 112 and to unlock the lock mechanism 102. This unlocking takes place as the wheel rotation moves the mold station to the FIG. 12 position where the locking cam 126 moves the yoke connector 184 toward the left so that the lock member 108 is moved to the unlocked position by movement of the locking portions 109 toward each other out of engagement with the keepers 106 as previously described. After the unlocking as described above, continued movement of the wheel 44 in the direction of arrow 118 from the position of FIG. 12 to the position of FIG. 13 causes the operating cams 124 of the opening station 116 to move the operating cam followers 110 away from each other in order to open the mold station by moving the mold supports 94 away from each other. After the opening of the mold station 90, the blow molded product can be ejected and the mold station is then ready for the next cycle.

Figure 23:
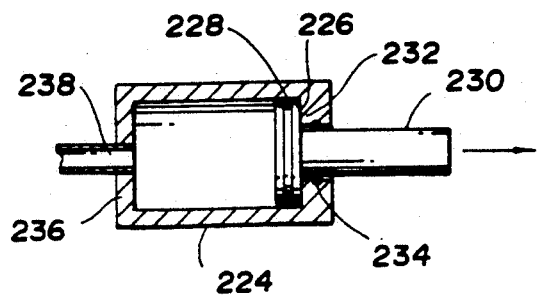
FIG. 23 is a schematic illustration of the construction of the gas springs of the machine.

Each of the gas springs of the machine has a construction as schematically illustrated in FIG. 23 with a cylinder housing 224 that slidably receives a piston 226 in a sealed relationship provided by an annular seal 228. Each piston 226 also includes a piston connecting rod 230 extending therefrom outwardly through one end 232 of the housing in a sealed relationship provided by an annular seal 234 of a smaller size than the seal 228. This piston connecting rod 230 biases the associated cam as previously described. The other end 236 of the housing 224 includes a gas inlet 238 through which pressurized gas is supplied to bias the piston 226 so that the rod 230 is biased outwardly with the piston seated as shown against the one housing end 232 while permitting inward rod movement with a gas spring bias. Of course, other gas spring constructions can also be utilized such as with a piston connected to a bladder-like seal that provides hermetic sealing while still providing the resilient bias of pressurized gas operating on the piston.

Figure 24:
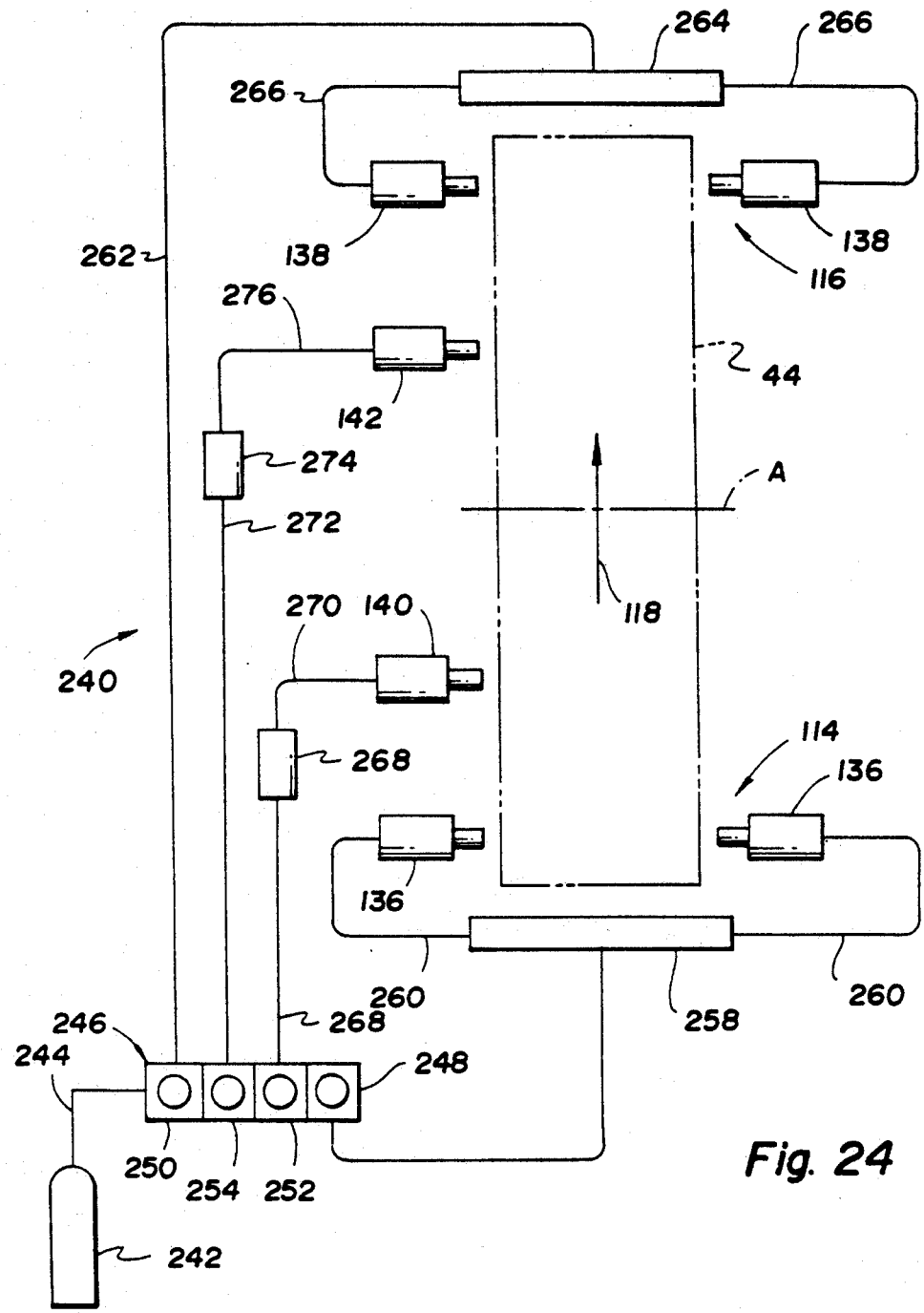
FIG. 24 is a schematic view of a gas supply system that controls the gas springs of the machine.

With reference to FIG. 24, a gas supply system generally indicated by 240 includes a pressurized gas source 242 such as pressurized nitrogen at about 3,000 pounds per square inch pressure for feeding through a conduit 244 to a regulator valve assembly 246 of the system. This regulator valve assembly 246 includes a closing operating regulator valve 248, an opening operating regulator valve 250, a closing locking regulator valve 252, and an opening locking regulator valve 254. Each of these valves 248, 250, 252 and 254 is adjustable to control the extent of pressure delivered to the associated gas spring or springs. More specifically, the closing operating valve 248 feeds a conduit 256 that is communicated with an equalizing tank 258 that feeds a pair of conduits 260 communicated with the inlets of the operating gas springs 136 of the closing station 114. Likewise, the opening operating valve 250 feeds a conduit 262 that is communicated with an equalizing tank 264 communicated with a pair of conduits 266 that feed the operating gas springs 138 of the opening station 116. The closing locking valve 252 feeds a conduit 268 communicated with a tank 268 that feeds a conduit 270 communicated with the inlet of the closing locking gas spring 140. Likewise, the opening locking valve 254 feeds a conduit 272 communicated with a tank 274 that feeds a conduit 276 communicated with the inlet of the opening locking gas spring 142. Each of the tanks 258, 264, 268 and 274 allows resilient piston movement of the associated locking gas spring during machine operation while providing a generally uniform gas pressure under the adjustment of the associated valve. In addition, the two equalizing tanks 258 and 264 provide the same cam positioning force to the two operating gas springs fed thereby so that a symmetrical force is applied to both mold supports of each mold station during both closing and opening. The pressurized gas force supplied to the locking cams is less than the force supplied to the operating cams so as to permit the locking cams to move on the support arms carrying the operating cams as previously described.

While the best mode for carrying out the invention has been described in detail, those familiar with the art to which this invention relates will recognize various alternative designs and embodiments for practicing the invention as defined by the following claims.

What is claimed is:

1. A plastic blow molding machine comprising: a base; a wheel including a frame supported on the base for rotation about a horizontal rotational axis; said frame including at least two frame portions spaced horizontally from each other along the rotational axis; a plurality of mold stations mounted on the wheel about the rotational axis; each mold station including at least ne frame connecting member that extends between the frame portions of the wheel; each mold station including a pair of mold supports for respectively mounting a pair of mold portions of a mold; the pair of mold supports of each mold station being mounted on the connecting member thereof for movement parallel to the rotational axis between a mold open position where the mold portions are spaced from each other and a mold closed position where the mold portions define an enclosed cavity; each mold station including a locking mechanism having a pair of locks respectively mounted on the mold supports on opposite sides of a mold supported thereby; each lock including a keeper on one of the respective mold supports; each lock also having a lock member that is mounted on the other respective mold support for movement to a locked position in engagement with the respective keeper of the one mold support to maintain the respective mold in the closed position, and each lock member being movable to an unlocked position out of engagement with the keeper of the one mold support to permit movement of the mold supports and the mold mounted thereby to the open position; each mold station having operating and locking cam followers for respectively moving its mold supports and its lock members; closing and opening stations spaced from each other on the base along the path of movement of the mold stations about the rotational axis as the wheel rotates about the rotational axis; the closing and opening stations each including respective operating and locking cams mounted on the base to respectively move the operating and locking cam followers of each mold station on the wheel; at least one operating gas spring for biasing the operating cams of the closing and opening stations into camming positions to move the operating cam followers and close and open the molds on the mold supports, each operating cam being moved against the gas spring bias in case of malfunction of the mold supports, and the gas spring bias closing all of the molds on the mold supports of the wheel with a uniform force that is independent of cam follower, mold support and mold tolerances; and a drive for rotating the wheel to move the mold stations past the closing and opening stations where the operating and locking cams move the operating and locking cam followers to respectively close and open the molds on the mold supports and lock and unlock the lock members of the locking mechanisms of the mold stations such that the open mold is capable of receiving an extruded hot plastic parison from an extruder prior to subsequent mold closing and blow molding in the enclosed mold cavity.

2. A plastic bow molding machine as in claim 1 wherein each closing and opening station also includes a locking gas spring for biasing the locking cam thereof to a camming position to move the locking cam followers of the mold stations and thereby move the lock members between the locked and unlocked positions, and each locking cam being moved against the gas spring bias thereof in case of locking mechanism malfunction.

3. A plastic blow molding machine as in claim 1 wherein each mold station includes a pair of operating cam followers respectively mounted on the pair of mold supports, and the closing and opening stations each including a pair of operating cams that respectively move the pair of operating cam followers of each mold station during machine operation.

4. A plastic blow molding machine as in claim 3 wherein the closing and opening stations each include a pair of operating gas springs that respectively bias the pair of operating cams thereof to the camming positions with respect to the pairs of cam followers of the mold stations.

5. A plastic blow molding machine as in claim 4 wherein each mold station on the wheel includes a single locking cam follower with the respective mold support thereof on which the lock members are mounted to move the lock members between the locked and unlocked positions, and the closing and opening stations each including a single locking cam for moving the locking cam followers of the mold stations.

6. A plastic blow molding machine as in claim 5 wherein the closing and opening stations each include a pair of support arms on which the pair of operating cams are mounted, and the closing and opening stations each having the pair of operating gas springs thereof respectively biasing the pair of support arms thereof to position the operating cams thereon in the camming positions.

7. A plastic blow molding machine as in claim 6 wherein the closing and opening stations each have the single locking cam thereof mounted on the one of the support arms thereof, and the closing and opening stations each having a single locking gas spring that extends between said one support arm thereof and the locking cam mounted thereon to bias the locking cam to the camming position.

8. A plastic blow molding machine as in claim 7 wherein the support arms of each closing and opening station each have a pivotal connection for providing mounting thereof on the base, and the locking cam of each closing and opening station having a pivotal connection for providing mounting thereof on said one support arm of the station.

9. A plastic blow molding machine as in claim 6, 7 or 8 wherein the pair of support arms of the closing station each includes a lost motion connection that extends between the base and the support arm to locate the operating cam thereon in the camming position against the bias of the respective operating gas spring while also permitting movement against the bias of the respective operating gas spring as the mold is closed and upon malfunction of the mold supports.

10. A plastic blow molding machine as in any one of claims 6, 7 or 8 wherein the pair of support arms of the opening station each includes a guide that extends between the base and the support arm to provide guiding in the movement thereof about the respective pivotal connection.

11. A plastic blow molding machine comprising: a base; a wheel including a frame supported on the base for rotation about a horizontal rotational axis; said frame including three frame portions spaced horizontally from each other along the rotational axis; two of the frame portions being end frame portions which are located on opposite sides of the other frame portion which is a central frame portion; a plurality of mold stations mounted on the wheel about the rotational axis; each mold station including a pair of mold supports for respectively mounting a pair of mold portions of a mold; each mold station including a pair of frame connecting members that extend between the end and central frame portions of the wheel frame and mount the mold supports thereof for movement parallel to the rotational axis between a mold open position where the mold portions are spaced from each other and a mold closed position where the mold portions define an enclosed cavity; each mold station having a pinion supported for rotation on the central frame portion; the mold supports of each mold station each having a respective rack that is meshed with the pinion thereof to coordinate the movement of the mold support portions with each other; each mold station including a locking mechanism having a pair of locks respectively mounted on the mold supports on opposite sides of a mold supported thereby; each lock including a keeper on one of the respective mold supports; each lock also having a lock member that is mounted on the other respective mold support for movement to a locked position in engagement with the respective keeper of the one mold support to maintain the respective mold in the closed position, and each lock member being movable to an unlocked position out of engagement with the keeper of the one mold support to permit movement of the mold supports and the mold mounted thereby to the open position; each mold station having operating and locking cam followers for respectively moving its mold supports and its lock members; closing and opening stations spaced from each other on the base along the path of movement of the mold stations about the rotational axis as the wheel rotates about the rotational axis; the closing and opening stations each including respective operating and locking cams mounted on the base to respectively move the operating and locking cam followers of each mold station on the wheel; and a drive for rotating the wheel to move the mold stations past the closing and opening stations where the operating and locking cams move the operating and locking cam followers to respectively close and open the molds on the mold supports and lock and unlock the lock members of the locking mechanisms of the mold stations such that the open mold is capable of receiving an extruded hot plastic parison from an extruder prior to subsequent mold closing and blow molding in the enclosed cavity.

12. A plastic blow molding machine as in claim 11 wherein each mold station includes a pair of operating cam followers respectively mounted on the pair of mold supports thereof, and the closing and opening stations each including a pair of operating cams that respectively move the pair of operating cam followers of each mold station under the coordination of the pinion on the central frame portion and the racks that are respectively mounted on the pair of mold supports of the mold station.

13. A plastic blow molding machine as in claim 12 where each mold station includes a single locking cam follower mounted on the mold support thereof on which the lock members are mounted to move the lock members between the locked and unlocked positions, and each closing and opening station including a single locking cam for moving the locking cam followers of the mold stations.

14. A plastic blow molding machine as in claim 13 wherein the pair of locks of the locking mechanism of each mold station each include a pair of keepers on the one mold support thereof and also has its lock member on the other mold support thereof constructed to include a pair of locking portions that respectively move between the locked and unlocked position into and out of engagement with the respective pair of keepers on the other mold support.

15. A plastic blow molding machine as in claim 14 wherein the pair of locks of the locking mechanism of each mold station each includes a pair of spaced lock member guides that respectively mount the pair of locking portions of the respective lock member on the respective mold support for movement between the locked and unlocked positions with respect to the respective pair of keepers on the other mold support.

16. A plastic blow molding machine as in claim 13, 14 or 15 wherein each mold station includes a yoke connector having a stem connected to the locking follower on the respective mold support and having a pair of spaced legs that extend from the stem on opposite sides of each mold station and are respectively connected to the pair of locks of the locking mechanism to provide movement of the lock members between the locked and unlocked positions.

17. A plastic blow molding machine as in claim 13 wherein the closing and opening stations each include a pair of operating gas springs for respectively biasing the pair of operating cams thereof to the camming position, and the closing and opening stations each including a single locking gas spring for biasing the single locking cam thereof to the camming position.

18. A plastic blow molding machine as in claim 17 wherein the closing and opening stations each include a pair of support arms on which the pair of operating cams are mounted, the closing and opening stations each having the pair of operating gas springs thereof respectively biasing the pair of support arms thereof to position the operating cams thereon in the camming positions.

19. A plastic blow molding machine as in claim 18 wherein the closing and opening stations each have the single locking cam thereof mounted on one of the support arms thereof, and the closing and opening stations each having the single locking gas spring thereof extending between said one support arm thereof and the locking cam mounted thereon to bias the locking cam to the camming position.

20. A plastic blow molding machine as in claim 19 wherein the support arms of each closing and opening station each have a pivotal connection for providing mounting thereof on the base, and the locking cam of each closing and opening station having a pivotal connection for providing mounting thereof on said one support arm of the station.

21. A plastic blow molding machine as in claim 18, 19 or 20 wherein each of the pair of support arms of the closing station includes a lost motion connection that extends between the base and the support arm to locate the operating cam thereon in the camming position against the bias of the respective operating gas spring while also permitting movement against the bias of the respective operating gas spring upon malfunction of the mold supports.

22. A plastic blow molding machine as in claim 18, 19 or 20 wherein the pair of support arms of the opening stations each includes a guide that extends between the base and the support arm to provide guiding in the movement thereof about the associated pivotal connection.

23. A plastic blow molding machine comprising: a base; a wheel including a frame supported on the base for rotation about a horizontal rotational axis; said frame including at least two frame portions spaced horizontally from each other along the rotational axis; a plurality of mold stations mounted on the wheel about the rotational axis; each mold station including at least one frame connecting member that extends between the frame portions of the wheel; each mold station including a pair of mold supports for respectively mounting a pair of mold portions of a mold; the pair of mold supports of each mold station being mounted on the connecting member thereof for movement parallel to the rotational axis between a mold open position where the mold portions are spaced from each other and a mold closed position where the mold portions define an enclosed cavity; each mold station including a locking mechanism having a pair of locks respectively mounted on the mold supports on opposite sides of a mold supported thereby; each lock including a keeper on one of the respective mold supports; each lock also having a lock member that is mounted on the other respective mold support for movement to a locked position in engagement with the respective keeper of the one mold support to maintain the respective mold in the closed position, and each lock member being movable to an unlocked position out of engagement with the keeper of the one mold support to permit movement of the mold supports and the mold mounted thereby to the open position; each mold station having a pair of operating cam followers respectively mounted on its mold supports to provide movement thereof toward and away from each other; each mold station also having a single locking cam follower for moving its lock members; closing and opening stations spaced from each other on the base along the path of movement of the mold stations about the rotational axis as the wheel rotates about the rotational axis; the closing station including a pair of support arms mounted on the base and having a pair of operating cams mounted thereon; the closing station including a pair of operating gas springs that respectively bias the pair of support arms thereof to position the operating cams thereof to engage the operating cam followers of the mold stations to close the molds mounted thereon; the closing station including a single locking cam mounted on one of the support arms thereof and also including a single locking gas spring mounted on said one support arm thereof to bias the locking cam thereof into a camming position for engaging the locking cam followers of the mold stations to move the lock members to the locked positions; the opening station including a pair of support arms mounted on the base and having a pair of operating cams mounted thereon; the opening station including a pair of operating gas springs that respectively bias the pair of support arms thereof to position the operating cams thereof to engage the operating cam followers of the mold stations to open the molds mounted thereon; the opening station including a single locking cam mounted on one of the support arms thereof and also including a single locking gas spring mounted on said one support arm thereof to bias the locking cam thereof into a camming position for engaging the locking cam followers of the mold stations to move the lock members to the unlocked position; and a drive for rotating the wheel to move the mold stations past the closing and opening stations where the operating and locking cam move the operating and locking cam followers to respectively close and open the molds to the mold supports and lock and unlock the lock members of the locking mechanisms of the mold stations such that the open mold is capable of receiving an extruded hot plastic parison from an extruder prior to subsequent mold closing and blow molding in the enclosed mold cavity.

24. A plastic blow molding machine comprising: a base; a wheel including a frame supported on the base for rotation about a horizontal rotational axis; said frame including at least three frame portions spaced horizontally from each other along the rotational axis; two of the frame portions being end frame portions which are located on opposite sides of the other frame portion which is a central frame portion; a plurality of mold stations mounted on the wheel about the rotational axis; each mold station including a pair of frame connecting members that extend between the end and central frame portions of the wheel; each mold station including a pair of mold supports for respectively mounting a pair of mold portions of a mold; the pair of mold supports of each mold station being mounted on the connecting members thereof for movement parallel to the rotational axis between a mold open position where the mold portions are spaced from each other and a mold closed position where the mold portions define an enclosed cavity; each mold station having a pinion supported for rotation on the central frame portion, and the mold support portions of each mold station each having a respective rack that is meshed with the pinion thereof to coordinate the movement of the mold support portions with each other; each mold station including a locking mechanism having a pair of locks respectively mounted on the mold supports on opposite sides of a mold supported thereby; each lock including a keeper on one of the respective mold supports; each lock also having a lock member that is mounted on the other respective mold support for movement to a locked position in engagement with the respective keeper of the one mold support to maintain the respective mold in the closed position, and each lock member being movable to an unlocked position out of engagement with the keeper of the one mold support to permit movement of the mold supports and the mold mounted thereby to the open position; each mold station having a pair of operating cam followers respectively mounted on its mold supports to provide movement thereof toward and away from each other; each mold station also having a single locking cam follower for moving its lock members; closing and opening stations spaced from each other on the base along the path of movement of the mold stations about the rotational axis as the wheel rotates about the rotational axis; the closing station including a pair of support arms mounted on the base and having a pair of operating cams mounted thereon; the closing station including a pair of operating gas springs that respectively bias the pair of support arms thereof to position the operating cams thereof to engage the operating cam followers of the mold stations to close the molds mounted thereon; the closing station including a single locking cam mounted on one of the support arms thereof and also including a single locking gas spring mounted on said one support arm thereof to bias the locking cam thereof into a camming position for engaging the locking cam followers of the mold stations to move the lock members to the locked positions; the opening station including a pair of support arms mounted on the base and having a pair of operating cams mounted thereon; the opening station including a pair of operating gas springs that respectively bias the pair of support arms thereof to position the operating cams thereof to engage the operating cam followers of the mold stations to open the molds mounted thereon; the opening station including a single locking cam mounted on one of the support arms thereof and also including a single locking gas spring mounted on said one support arm thereof to bias the locking cam thereof into a camming position for engaging the locking cam followers of the mold stations to move the lock members to the unlocked position; and a drive for rotating the wheel to move the mold stations past the closing and opening stations where the operating and locking cams move the operating and locking cam followers to respectively close and open the molds on the mold supports and lock and unlock the lock members of the locking mechanisms of the mold stations such that the open mold is capable of receiving an extruded hot plastic parison prior to subsequent mold closing and blow molding in the enclosed mold cavity.

* * * * *